US012626228B2

(12) United States Patent
Kim

(10) Patent No.: US 12,626,228 B2
(45) Date of Patent: May 12, 2026

(54) ENTERPRISE RESOURCE PLANNING SYSTEM HAVING FINANCIAL MANAGEMENT FUNCTION USING COMPUTER-IMPLEMENTED CALENDAR

(71) Applicant: SEOJIN Consulting network solution Co,. Ltd., Cheongju-si (KR)

(72) Inventor: Jaeyoung Kim, Cheongju-si (KR)

(73) Assignee: SEOJIN Consulting network solution Co,. Ltd., Cheongju-si (KR)

( * ) Notice: Subject to any disclaimer, the term of this patent is extended or adjusted under 35 U.S.C. 154(b) by 187 days.

(21) Appl. No.: 18/388,206

(22) Filed: Nov. 9, 2023

(65) Prior Publication Data

US 2025/0013988 A1      Jan. 9, 2025

Related U.S. Application Data

(63) Continuation of application No. PCT/KR2023/016350, filed on Oct. 20, 2023.

(30) Foreign Application Priority Data

Jul. 4, 2023      (KR) ........................ 10-2023-0086414

(51) Int. Cl.
*G06Q 10/1091* (2023.01)
*G06Q 40/12* (2023.01)

(52) U.S. Cl.
CPC ....... *G06Q 10/1091* (2013.01); *G06Q 40/125* (2013.12)

(58) Field of Classification Search
CPC .. G06Q 10/1091; G06Q 40/125; G06Q 10/06; G06Q 40/12; G06Q 40/02
See application file for complete search history.

(56) References Cited

U.S. PATENT DOCUMENTS

| | | | | | |
|---|---|---|---|---|---|
| 6,615,166 | B1 * | 9/2003 | Guheen | .................. | G06Q 10/06 703/27 |
| 7,315,826 | B1 * | 1/2008 | Guheen | .............. | G06Q 30/0201 705/7.29 |

FOREIGN PATENT DOCUMENTS

| | | | | |
|---|---|---|---|---|
| AU | 2013309097 A1 * | 4/2015 | ............ | G06Q 10/06 |
| KR | 10-0802510 B1 | 2/2008 | | |
| WO | WO-2005089526 A2 * | 9/2005 | .......... | G06Q 10/063 |
| WO | WO-2024091682 A1 * | 5/2024 | ............ | G06N 20/00 |

* cited by examiner

*Primary Examiner* — Garcia Ade
(74) *Attorney, Agent, or Firm* — Revolution IP, PLLC

(57) ABSTRACT

A pay sheet planning system includes a first information management unit that stores and manages, as a database, resolution information, on the basis of a resolution information input signal input through an input device of the manager computer; and a second information management unit that stores and manages, as a database, slip information, on the basis of resolution information, corresponding to a slip registration target selection signal input through the input device of the manager computer, in the resolution information that is generated, stored and managed through the first information management unit.

4 Claims, 17 Drawing Sheets

Figure 2:
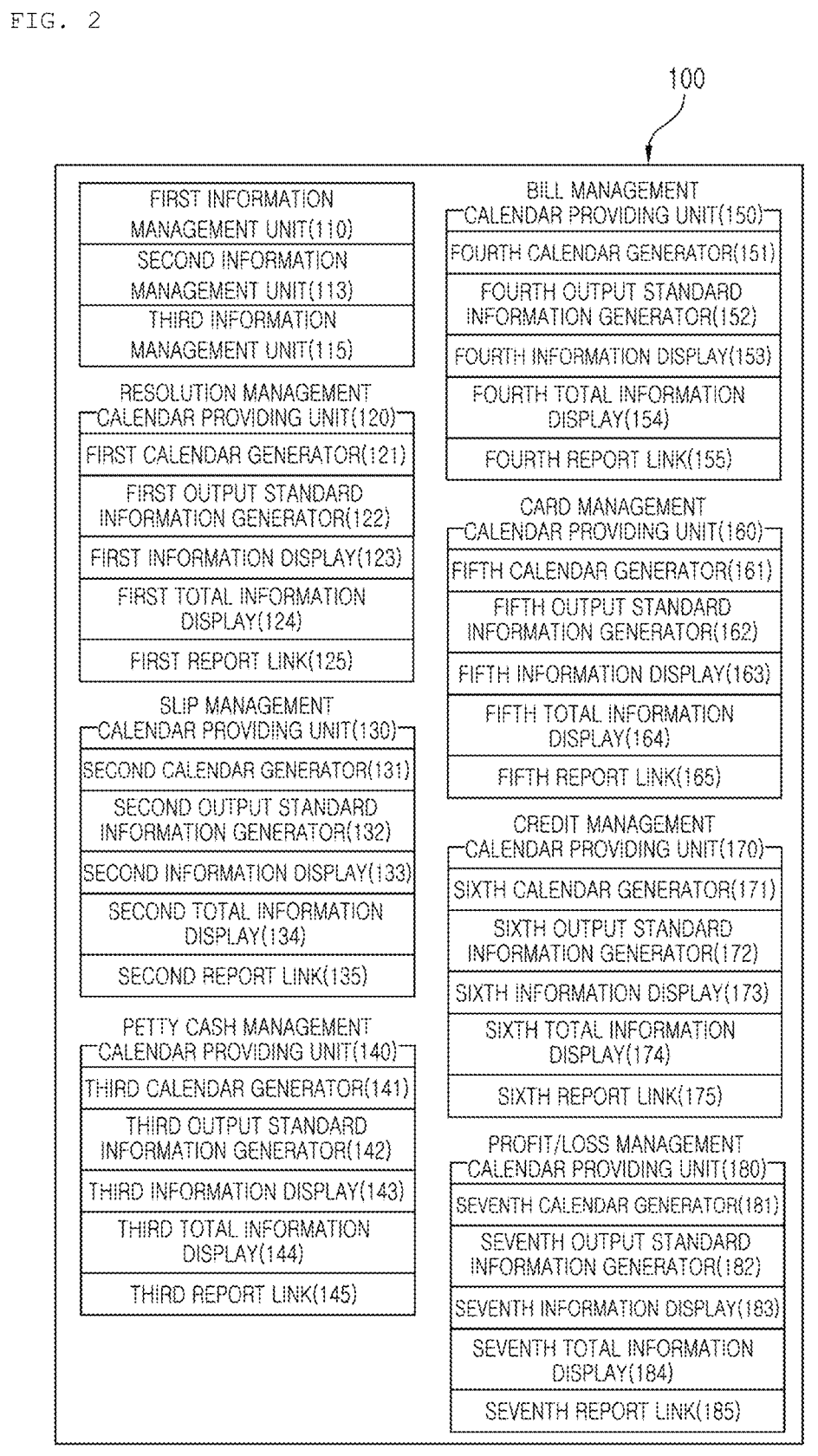

FIRST INFORMATION
MANAGEMENT UNIT(110)

SECOND INFORMATION
MANAGEMENT UNIT(113)

THIRD INFORMATION
MANAGEMENT UNIT(115)

RESOLUTION MANAGEMENT
CALENDAR PROVIDING UNIT(120)

FIRST CALENDAR GENERATOR(121)

FIRST OUTPUT STANDARD
INFORMATION GENERATOR(122)

FIRST INFORMATION DISPLAY(123)

FIRST TOTAL INFORMATION
DISPLAY(124)

FIRST REPORT LINK(125)

SLIP MANAGEMENT
CALENDAR PROVIDING UNIT(130)

SECOND CALENDAR GENERATOR(131)

SECOND OUTPUT STANDARD
INFORMATION GENERATOR(132)

SECOND INFORMATION DISPLAY(133)

SECOND TOTAL INFORMATION
DISPLAY(134)

SECOND REPORT LINK(135)

PETTY CASH MANAGEMENT
CALENDAR PROVIDING UNIT(140)

THIRD CALENDAR GENERATOR(141)

THIRD OUTPUT STANDARD
INFORMATION GENERATOR(142)

THIRD INFORMATION DISPLAY(143)

THIRD TOTAL INFORMATION
DISPLAY(144)

THIRD REPORT LINK(145)

BILL MANAGEMENT
CALENDAR PROVIDING UNIT(150)

FOURTH CALENDAR GENERATOR(151)

FOURTH OUTPUT STANDARD
INFORMATION GENERATOR(152)

FOURTH INFORMATION DISPLAY(153)

FOURTH TOTAL INFORMATION
DISPLAY(154)

FOURTH REPORT LINK(155)

CARD MANAGEMENT
CALENDAR PROVIDING UNIT(160)

FIFTH CALENDAR GENERATOR(161)

FIFTH OUTPUT STANDARD
INFORMATION GENERATOR(162)

FIFTH INFORMATION DISPLAY(163)

FIFTH TOTAL INFORMATION
DISPLAY(164)

FIFTH REPORT LINK(165)

CREDIT MANAGEMENT
CALENDAR PROVIDING UNIT(170)

SIXTH CALENDAR GENERATOR(171)

SIXTH OUTPUT STANDARD
INFORMATION GENERATOR(172)

SIXTH INFORMATION DISPLAY(173)

SIXTH TOTAL INFORMATION
DISPLAY(174)

SIXTH REPORT LINK(175)

PROFIT/LOSS MANAGEMENT
CALENDAR PROVIDING UNIT(180)

SEVENTH CALENDAR GENERATOR(181)

SEVENTH OUTPUT STANDARD
INFORMATION GENERATOR(182)

SEVENTH INFORMATION DISPLAY(183)

SEVENTH TOTAL INFORMATION
DISPLAY(184)

SEVENTH REPORT LINK(185)

FIG. 4

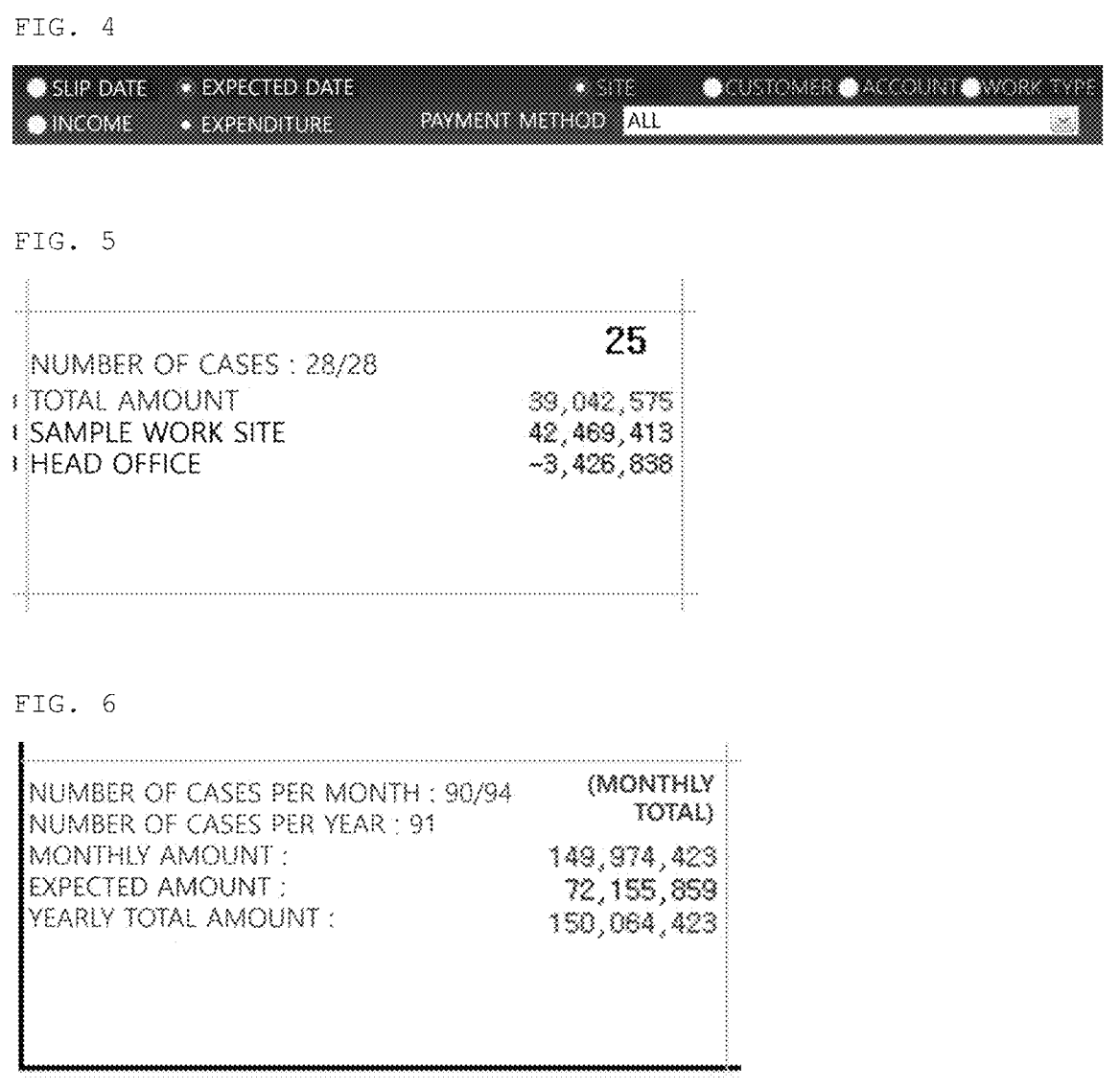

| ● SLIP DATE | ● EXPECTED DATE | | ● SITE | ● CUSTOMER | ● ACCOUNT | ● WORK TYPE |
| ● INCOME | ● EXPENDITURE | PAYMENT METHOD | ALL | | | |

FIG. 5

NUMBER OF CASES : 28/28                           25
TOTAL AMOUNT                          39,042,575
SAMPLE WORK SITE                      42,469,413
HEAD OFFICE                          ~3,426,838

FIG. 6

NUMBER OF CASES PER MONTH : 90/94        (MONTHLY
NUMBER OF CASES PER YEAR : 91               TOTAL)
MONTHLY AMOUNT :                      149,974,423
EXPECTED AMOUNT :                      72,155,859
YEARLY TOTAL AMOUNT :                 150,064,423

```
                                              21
NUMBER OF CASES : 5/5
TOTAL AMOUNT :                        9,256,000
HEAD OFFICE                           4,256,000
WORK SITE OF CULTURE CENTER           3,000,000
SAMPLE WORK SITE                      2,000,000
```

FIG. 9

```
NUMBER OF CASES PER MONTH : 219/254   (MONTHLY
NUMBER OF CASES PER YEAR : 216          TOTAL)
MONTHLY AMOUNT :                  1,845,162,449
EXPECTED AMOUNT :                 1,475,070,358
YEARLY TOTAL AMOUNT :             1,845,162,449

NUMBER OF CASES FOR PREVIOUS YEAR : 14/1,564%
PREVIOUS YEAR AMOUNT : 3,060,550/60,28%
```

```
                                        8
        57,200,000
        20,000,000
                 0
        77,200,000
```

```
                                 (MONTHLY
              0                   TOTAL)
    141,356,400 /  0.0
              0 /  0.0
    141,356,400
     81,660,000
              0 /  0.0
```

FIG. 25

ENTERPRISE RESOURCE PLANNING SYSTEM HAVING FINANCIAL MANAGEMENT FUNCTION USING COMPUTER-IMPLEMENTED CALENDAR

TECHNICAL FIELD

The present invention relates to an enterprise resource planning system having a financial management function using a computer-implemented calendar.

BACKGROUND ART

Enterprise resource planning (ERP) is a type of management information system (MIS), which refers to an integrated information system that integrates all elements of a company and efficiently manages all human and material resources within the company used for business activities to strengthen competitiveness of the company.

Such an enterprise resource planning system is applied in various industrial fields such as accounting, costing, sales, purchasing, materials, production, quality, facilities, funds, investment, and project management, which results in a marked increase in management and financial efficiency and improvement of work efficiency and management performance.

In this relation, the applicant of the present invention has proposed a technique for effectively managing and supervising workers' attendance through an enterprise resource planning system applied to work sites through "Enterprise Resource Planning System Connected with Entrance and Exit Data of Laborer" of Republic of Korea Patent No. 10-0802510.

Then, the applicant has continuously developed techniques for diversely expanding the scope of functionality of such an enterprise resource planning system applied to work sites, and has tried to develop a technique for providing financial management functions using calendars capable of easily viewing a variety of financial information at a glance and enhancing a manager's work efficiency and convenience in processing or printing management information.

In addition, the applicant has tried to develop a technique for providing various enterprise resource management functions using calendars to solve the problems of low visibility related to information provision, high difficulty in using information and low accessibility in the conventional enterprise resource planning system.

DISCLOSURE

Technical Problem

To solve the above problems, an object of the present invention is to provide a technique, in enterprise resource planning through various financial management functions related to resolutions, slips, petty cash, bills, cards, credits, profit/loss, and the like, capable of easily recognizing information through provision of the functions using a computer-implemented calendar and effectively and diversely utilizing the information.

Technical Solution

In order to achieve the above object, according to an aspect of the present invention, there is provided an enterprise resource planning system provided by an enterprise resource planning (ERP) program that is installed and implemented on a manager computer, including: a first information management unit that stores and manages, as a database, resolution information that is generated to include a resolution creation date, a company name, a site name, a work type name, a resolution type selected as one of income or expenditure, an account subject, a customer name, a supply price, a value-added tax, a total amount, a payment method, and a resolution cost expected-execution date, on the basis of a resolution information input signal that is input through an input device of the manager computer; a second information management unit that stores and manages, as a database, slip information that is generated to include a slip registration date, a company name, a site name, a work type name, a slip type selected as one of income or expenditure, an account subject, a customer name, a supply price, a value-added tax, a total amount, a payment method, and a slip cost expected-execution date, on the basis of resolution information, corresponding to a slip registration target selection signal that is input through the input device of the manager computer, in the resolution information that is generated, stored and managed through the first information management unit; a resolution management calendar providing unit that outputs and provides, to an output device of the manager computer, a calendar that displays the resolution information that is generated, stored and managed through the first information management unit in correspondence with a resolution creation date or a resolution cost expected-execution date for each date in the calendar; and a slip management calendar providing unit that outputs and provides, to the output device of the manager computer, a calendar that displays the slip information that is generated, stored and managed through the second information management unit in correspondence with a slip registration date or a slip cost expected-execution date for each date in the calendar.

The enterprise resource planning system having a financial management function using the computer-implemented calendar includes: a third information management unit that stores and manages, as a database, real-time cash information that is generated from at least one of bank account information regarding a balance in at least one pre-registered bank account that is linked to a financial institution server to be provided upon request and cash-on-hold information that is generated on the basis of a cash-on-hold information input signal that is input through the input device of the manager computer; a petty cash management calendar providing unit that outputs and provides, to the output device of the manager computer, a calendar that displays petty cash information including information regarding a cash balance as of the previous day, a today's income cash amount, a today's expenditure cash amount, and a cash balance as of today, in correspondence with the slip registration date or the slip cost expected-execution date for each date in the calendar, on the basis of slip information in which the payment method is set to cash transfer in the slip information that is generated, stored and managed through the second information management unit and the real-time cash information that is generated, stored and managed through the third information management unit; a bill management calendar providing unit that outputs and provides, to the output device of the manager computer, a calendar that displays promissory information including information regarding a bill as of the previous day, a today's bill payment amount, and a bill balance as of today, in correspondence with the slip registration date or the slip cost expected-execution date for each date in the calendar, on the basis of slip information in which the payment method is set to bills in the slip information that is generated, stored and managed through the second information management unit; a card management calendar providing unit that outputs and provides, to the output device of the manager computer, a calendar that displays card information including information regarding a card balance as of the previous day, a today's card payment slip issue amount, a today's card payment amount, and a card balance as of today, in correspondence with the slip registration date or the slip cost expected-execution date for each date in the calendar, on the basis of slip information in which the payment method is set to cards in the slip information that is generated, stored and managed through the second information management unit; and a credit management calendar providing unit that outputs and provides, to the output device of the manager computer, a calendar that displays credit information including information regarding a credit balance as of the previous day, a today's credit payment slip issue amount, a today's credit payment amount, and a credit balance as of today, in correspondence with the slip registration date or the slip cost expected-execution date for each date in the calendar, on the basis of slip information in which the payment method is set to credit in the slip information that is generated, stored and managed through the second information management unit.

Further, the enterprise resource planning system having the financial management function using the computer-implemented calendar includes a profit/loss management calendar providing unit that outputs and provides, to the output device of the manager computer, a calendar that displays profit/loss information including information regarding a total income corresponding to a total amount of slips of an income type, information regarding a total expenditure corresponding to a total amount of slips of an expenditure type, and information regarding a margin between the total income and the total expenditure, in correspondence with the slip registration date or the slip cost expected-execution date for each date in the calendar, on the basis of the slip information that is generated, stored and managed through the second information management unit.

Here, the resolution management calendar providing unit includes: a first calendar generator that generates a resolution management calendar including a plurality of first date sections having a first date display area and a first information display area, and a first total information section having a first monthly total information display area for the resolution information; a first output standard information generator that generates resolution management calendar output standard information including information regarding a first resolution information output standard for determining which one of a resolution registration date and a resolution cost expected-execution date the resolution information is to be displayed on the basis of, information regarding a second resolution information output standard for determining which resolution type of an income and an expenditure the resolution information is to be displayed on the basis of, and information regarding a third resolution information output standard for determining which one of a site name, a work type name, an account subject and a customer name a specification of the resolution information is to be displayed on the basis of, for each first date section and each first total information section, on the basis of a resolution management calendar output standard setting signal that is input through the input device of the manager computer; a first information display that displays, while making resolution information that satisfies the second resolution information output standard in the resolution information that is generated, stored and managed through the first information management unit correspond to each date in the resolution management calendar according to the first resolution information output standard, specification information on a total number of the resolution information corresponding to each date, a total amount, or a site name, a work type name, an account subject or a customer name-based total amount according to the third resolution information output standard, in each first information display area in the plurality of first date sections, on the basis of the resolution management calendar output standard information that is generated through the first output standard information generator; a first total information display that correspondingly displays monthly resolution total information including information on a total number and a total amount of monthly resolution information in the first monthly total information display area in the first total information section, on the basis of the resolution information displayed in each of the plurality of first date sections through the first information display; and a first report link that, on the basis of an area selection signal in the resolution management calendar that is input through the input device of the manager computer, provides, in a case where an area corresponding to the area selection signal in the resolution management calendar is the first information display area in the first date section for a specific date, a separate pop-up window for outputting a resolution status report for the specific date using resolution information displayed in the area, provides a separate pop-up window for outputting a resolution status report for a specific month in a case where the area corresponding to the area selection signal in the resolution management calendar is the first monthly total information display area in the total information section, and provides, in a case where the area corresponding to the area selection signal in the resolution management calendar is the first date display area in the first date section for the specific date, a separate pop-up window for inputting/outputting resolution information that allows confirmation of a specification of resolution information displayed in the area and generation of resolution information based on the resolution information input signal that is input through the input device of the manager computer.

In addition, the slip management calendar providing unit includes: a second calendar generator that generates a slip management calendar including a plurality of second date sections having a second date display area and a second information display area, and a second total information section having a second monthly total information display area for the slip information; a second output standard information generator that generates slip management calendar output standard information including information regarding a first slip information output standard for determining which one of a slip registration date and a slip cost expected-execution date the slip information is to be displayed on the basis of, information regarding a second slip information output standard for determining which slip type of an income and an expenditure the slip information is to be displayed on the basis of, and information regarding a third slip information output standard for determining which one of a site name, a work type name, an account subject and a customer name a specification of the slip information is to be displayed on the basis of, for each second date section and each second total information section, on the basis of a slip management calendar output standard setting signal that is input through the input device of the manager computer; a second information display that displays, while making slip information that satisfies the second slip information output standard in the slip information that is generated, stored and managed through the second information management unit correspond to each date in the slip management calendar according to the first slip information output standard, specification information on a total number of the slip information corresponding to each date, a total amount, or a site name, a work type name, an account subject or a customer name-based total amount according to the third slip information output standard, in each second information display area in the plurality of second date sections, on the basis of the slip management calendar output standard information that is generated through the second output standard information generator; a second total information display that correspondingly displays monthly slip total information including information on a total number and a total amount of monthly slip information in the second monthly total information display area in the second total information section, on the basis of the slip information displayed in each of the plurality of second date sections through the second information display; and a second report link that, on the basis of an area selection signal in the slip management calendar that is input through the input device of the manager computer, provides, in a case where an area corresponding to the area selection signal in the slip management calendar is the second information display area in the second date section for a specific date, a separate pop-up window for outputting a slip ledger report for the specific date using slip information displayed in the area, provides a separate pop-up window for outputting a slip ledger status report for a specific month in a case where the area corresponding to the area selection signal in the slip management calendar is the second monthly total information display area in the total information section, and provides, in a case where the area corresponding to the area selection signal in the slip management calendar is the second date display area in the second date section for the specific date, a separate pop-up window for inputting/outputting slip information that allows confirmation of a specification of slip information displayed in the area and generation of slip information based on resolution information corresponding to the slip registration target selection signal input signal that is input through the input device of the manager computer.

Further, the petty cash management calendar providing unit includes: a third calendar generator that generates a petty cash management calendar including a plurality of third date sections having a third date display area and a third information display area, and a third total information section having a third monthly total information display area for the petty cash information; a third output standard information generator that generates petty cash management calendar output standard information including information regarding a first petty cash information output standard for determining which one of a slip registration date and a slip cost expected-execution date, in the slip information in which the payment method is set to cash transfer, the petty cash information is to be displayed on the basis of, and information regarding a second petty cash information output standard for determining which one of entire bank accounts and a specific bank account among at least one bank account managed by the third information management unit the petty cash information is to be displayed on the basis of, on the basis of a petty cash management calendar output standard setting signal that is input through the input device of the manager computer; a third information display that displays, while making slip information that satisfies the second petty cash information output standard in the slip information that is generated, stored and managed through the second information management unit, in which the payment method is set to cash transfer, correspond to each date in the petty cash management calendar according to the first petty cash information output standard, the petty cash information corresponding to each date in each third information display area in the plurality of third date sections, on the basis of the petty cash management calendar output standard information that is generated through the third output standard information generator; a third total information display that correspondingly displays monthly petty cash total information including information on a total amount of specifications of the monthly petty cash information in the third monthly total information display area in the third total information section, on the basis of the petty cash information displayed in each of the plurality of third date sections through the third information display; and a third report link that, on the basis of an area selection signal in the petty cash management calendar that is input through the input device of the manager computer, provides, in a case where an area corresponding to the area selection signal in the petty cash management calendar is the third information display area in the third date section for a specific date, a separate pop-up window for outputting a cashbook report for the specific date using petty cash information displayed in the area, provides a separate pop-up window for outputting a cashbook report for a specific month in a case where the area corresponding to the area selection signal in the petty cash management calendar is the third monthly total information display area in the third total information section, and provides, in a case where the area corresponding to the area selection signal in the petty cash management calendar is the third date display area in the third date section for the specific date, the same pop-up window as the pop-up window provided through the second report link.

Further, the bill management calendar providing unit includes: a fourth calendar generator that generates a bill management calendar including a plurality of fourth date sections having a fourth date display area and a fourth information display area, and a fourth total information section having a fourth monthly total information display area for the bill information; a fourth output standard information generator that generates bill management calendar output standard information including information regarding a first bill information output standard for determining which one of a slip registration date and a slip cost expected-execution date, in the slip information in which the payment method is set to bills, the bill information is to be displayed on the basis of, and information regarding a second bill information output standard for determining which bill type of an income related to bills-receivable and an expenditure related to bills-payable in the slip information the bill information is to be displayed on the basis of, for each fourth date section and each fourth total information section, on the basis of a bill management calendar output standard setting signal that is input through the input device of the manager computer; a fourth information display that displays, while making slip information that satisfies the second bill information output standard in the slip information that is generated, stored and managed through the second information management unit, in which the payment method is set to bills, correspond to each date in the bill management calendar according to the first bill information output standard, bill information corresponding to each date in each fourth information display area in the plurality of fourth date sections, on the basis of the bill management calendar output standard information that is generated through the fourth output standard information generator; a fourth total information display that correspondingly displays monthly bill total information including information on a total amount of specifications of monthly bill information in the fourth monthly total information display area in the fourth total information section, on the basis of the bill information displayed in each of the plurality of fourth date sections through the fourth information display; and a fourth report link that, on the basis of an area selection signal in the bill management calendar that is input through the input device of the manager computer, provides, in a case where an area corresponding to the area selection signal in the bill management calendar is the fourth information display area in the fourth date section for a specific date, a separate pop-up window for outputting a bill ledger report for the specific date using bill information displayed in the area, provides a separate pop-up window for outputting a bill ledger report for a specific month in a case where the area corresponding to the area selection signal in the bill management calendar is the fourth monthly total information display area in the fourth total information section, and provides, in a case where the area corresponding to the area selection signal in the bill management calendar is the fourth date display area in the fourth date section for the specific date, the same pop-up window as the pop-up window provided through the second report link. The card management calendar providing unit includes: a fifth calendar generator that that generates a card management calendar including a plurality of fifth date sections having a fifth date display area and a fifth information display area, and a fifth total information section having a fifth monthly total information display area for the card information; a fifth output standard information generator that generates card management calendar output standard information including information regarding a first card information output standard for determining which one of a slip registration date and a slip cost expected-execution date, in the slip information in which the payment method is set to cards, the card information is to be displayed on the basis of, information regarding a second card information output standard for determining which slip type of an income and an expenditure in the slip information the card information is to be displayed on the basis of, and information regarding a third card information output standard for determining which one of entire cards and a specific card, in card identification information of slip information in which the payment method is set to cards, the card information is to be displayed on the basis of, for each fifth date section and each fifth total information section, on the basis of a card management calendar output standard setting signal that is input through the input device of the manager computer; a fifth information display that displays, while making slip information that satisfies the second card information output standard and the third card information output standard in the slip information that is generated, stored and managed through the second information management unit, in which the payment method is set to cards, correspond to each date in the card management calendar according to the first card information output standard, the card information corresponding to each date in each fifth information display area in the plurality of fifth date sections, on the basis of the card management calendar output standard information that is generated through the fifth output standard information generator; a fifth total information display that correspondingly displays monthly card total information including information on a total amount of specifications of monthly card information in the fifth monthly total information display area in the fifth total information section, on the basis of the card information displayed in each of the plurality of fifth date sections through the fifth information display; and a fifth report link that, on the basis of an area selection signal in the card management calendar that is input through the input device of the manager computer, provides, in a case where an area corresponding to the area selection signal in the card management calendar is the fifth information display area in the fifth date section for a specific date, a separate pop-up window for outputting a credit card purchase status report or a credit card sales status report for the specific date using card information displayed in the area, provides a separate pop-up window for outputting a credit card purchase status report or a credit card sales status report for a specific month in a case where the area corresponding to the area selection signal in the card management calendar is the fifth monthly total information display area in the fifth total information section, and provides, in a case where the area corresponding to the area selection signal in the card management calendar is the fifth date display area in the fifth date section for the specific date, the same pop-up window as the pop-up window provided through the second report link, on the basis of the area selection signal within the card management calendar that is input by the input device of the manager computer. The credit management calendar providing unit includes: a sixth calendar generator that generates a credit management calendar including a plurality of sixth date sections having a sixth date display area and a sixth information display area, and a sixth total information section having a sixth monthly total information display area for credit information; a sixth output standard information generator that generates credit management calendar output standard information including information regarding a first credit information output standard for determining which one of a slip registration date and a slip cost expected-execution date the slip information in which the payment method is set to credit is to be displayed on the basis of, and information regarding a second credit information output standard for determining which slip type of an income and an expenditure in the slip information credit information is to be displayed on the basis of, for each sixth date section and each sixth total information section, on the basis of a credit management calendar output standard setting signal that is input through the input device of the manager computer; a sixth information display that displays, while making slip information that satisfies the second credit information output standard in the slip information that is generated, stored and managed through the second information management unit, in which the payment method is set to credit, correspond to each date in the credit management calendar according to the first credit information output standard, the credit information corresponding to each date in each sixth information display area in the plurality of sixth date sections, on the basis of the credit management calendar output standard information that is generated through the sixth output standard information generator; a sixth total information display that correspondingly displays monthly credit total information including information on a total amount of specifications of monthly credit information in the sixth monthly total information display area in the sixth total information section, on the basis of the credit information displayed in each of the plurality of sixth date sections through the sixth information display; and a sixth report link that, on the basis of an area selection signal in the credit management calendar that is input through the input device of the manager computer, provides, in a case where an area corresponding to the area selection signal in the credit management calendar is the sixth information display area in the sixth date section for a specific date, a separate pop-up window for outputting a credit purchase ledger report or a credit sales ledger report for the specific date using credit information displayed in the area, provides a separate pop-up window for outputting a total unpaid state report for a specific month in a case where the area corresponding to the area selection signal in the credit management calendar is the sixth monthly total information display area in the sixth total information section, and provides, in a case where the area corresponding to the area selection signal in the credit management calendar is the sixth date display area in the sixth date section for the specific date, the same pop-up window as the pop-up window provided through the second report link, on the basis of the area selection signal within the credit management calendar that is input through the input device of the manager computer.

The profit/loss management calendar providing unit includes: a seventh calendar generator that generates a credit management calendar including a plurality of seventh date sections having a seventh date display area and a seventh information display area, and a seventh total information section having a seventh monthly total information display area for credit information; a seventh output standard information generator that generates profit/loss management calendar output standard information including information regarding a first profit/loss information output standard for determining which one of a slip registration date and a slip cost expected-execution date in the slip information the profit/loss information is to be displayed on the basis of, information regarding a second profit/loss information output standard for determining which one of a date-based display and a month-based date-cumulative display the profit/loss information is to be displayed on the basis of, information regarding a third profit/loss information output standard for determining whether to display an increase/decrease ratio compared to the previous day in at least one of a total income, a total expenditure, and a difference between the total income and the total expenditure in the slip information, information regarding a fourth profit/loss information output standard for determining whether to display information on at least one of an increase/decrease ratio of the total expenditure to the total income and an increase/decrease ratio of the difference between the total income and the total expenditure in the slip information, and information regarding a fifth profit/loss information output standard for determining which of a supply price, a value-added tax, or a total amount of the supply value and the value-added tax in the slip information the total income, the total expenditure, and the difference between the total income and total expenditure are to be displayed on the basis, for each seventh date section and each seventh total information section, on the basis of a credit management calendar output standard setting signal that is input through the input device of the manager computer; a seventh information display that displays, while making profit/loss information generated by computing the slip information that is generated, stored and managed through the second information management unit according to the third profit/loss output standard to the fifth profit/loss information output standard correspond to each date in the profit/loss management calendar according to the first profit/loss information output standard and the second profit/loss information output standard, the profit/loss information corresponding to each date in each seventh information display area in the plurality of seventh date sections, on the basis of the profit/loss management calendar output standard information that is generated through the seventh output standard information generator; a seventh total information display that correspondingly displays monthly profit/loss total information including information on a total amount of specifications of monthly profit/loss information in the seventh monthly total information display area in the seventh total information section, on the basis of the profit/loss information displayed in each of the plurality of seventh date sections through the seventh information display; and a seventh report link that, on the basis of an area selection signal in the profit/loss management calendar that is input through the input device of the manager computer, provides, in a case where an area corresponding to the area selection signal in the profit/loss management calendar is the seventh information display area in the seventh date section for a specific date, a separate pop-up window for outputting a profit/loss ledger report using profit/loss information displayed in the area, provides a separate pop-up window for outputting a profit/loss status report for a specific month in a case where the area corresponding to the area selection signal in the profit/loss management calendar is the seventh monthly total information display area in the seventh total information section, and provides, in a case where the area corresponding to the area selection signal in the profit/loss management calendar is the seventh date display area in the seventh date section for the specific date, the same pop-up window as the pop-up window provided through the second report link, on the basis of the area selection signal within the profit/loss management calendar that is input through the input device of the manager computer.

Advantageous Effects

According to the present invention, the following effects are achieved.

First, it is possible to provide various financial management functions related to resolutions, slips, petty cash, bills, cards, credits, profit/loss, etc. using calendars through the enterprise resource planning system.

Second, by providing financial management functions for various items using calendars in enterprise resource planning, it is possible to easily recognize a variety of management information related thereto at a glance.

Third, in providing the financial management functions for various items using calendars in the enterprise resource planning, linked pop-up information is set for each area where information is displayed, and thus, it is possible to easily to document and print information recognized by a manager.

BRIEF DESCRIPTION OF DRAWINGS

The above and other objects, features and other advantages of the present invention will be more clearly understood from the following detailed description taken in conjunction with the accompanying drawings, in which:

FIG. 2 is a block diagram showing components of the enterprise resource planning system having the financial management function using the computer-implemented calendar according to the embodiment of the present invention;

FIGS. 3 to 6 are reference diagrams for illustrating a management function providing form through a resolution management calendar providing unit in the enterprise resource planning system according to the embodiment of the present invention;

FIGS. 7 to 9 are reference diagrams for illustrating a management function providing form through a slip management calendar providing unit in the enterprise resource planning system according to the embodiment of the present invention;

FIGS. 25 to 28 are reference diagrams for illustrating a management function providing form through a profit/loss management calendar providing unit in the enterprise resource planning system according to the embodiment of the present invention.

BEST MODE

Preferred embodiments of the present invention will be described in more detail with reference to the accompanying drawings, but well-known technical parts will be omitted or shortened for ease of description.

<Description of Components and Functions of Enterprise Resource Planning System Having Financial Management Function Using Computer-Implemented Calendar>

First, an enterprise resource planning system 100 provided by an enterprise resource planning (ERP) program installed and implemented on a manager computer 1 according to an embodiment of the present invention will be described in detail with reference to FIGS. 1 and 2.

Figure 1:
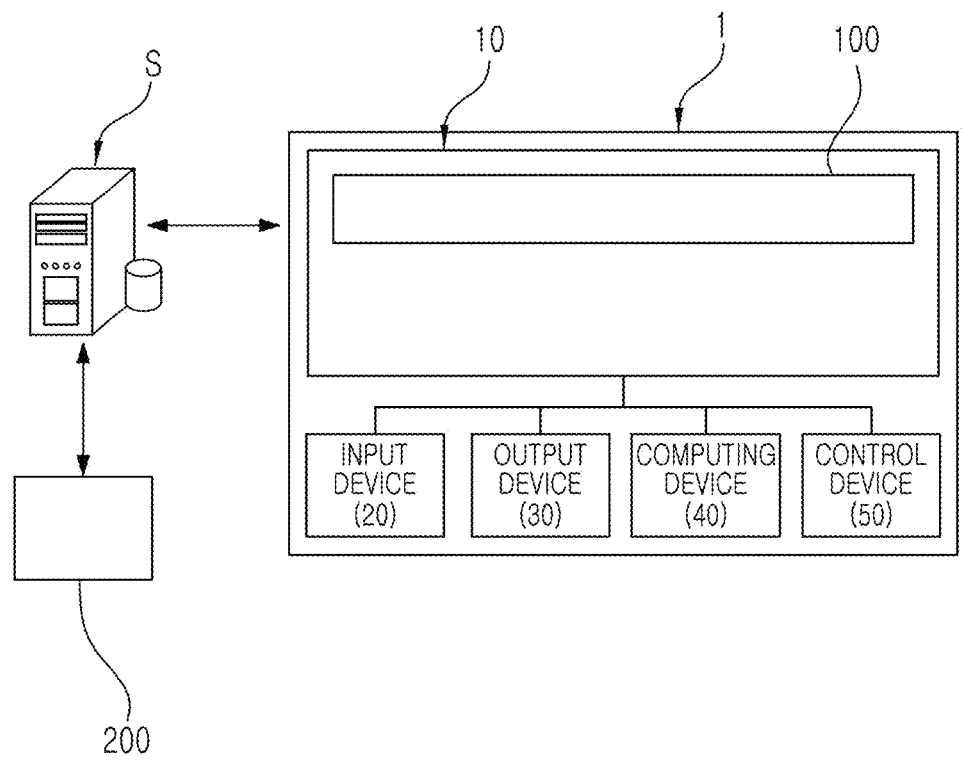
FIG. 1 is a configuration diagram showing an enterprise resource planning system having a financial management function using a computer-implemented calendar according to an embodiment of the present invention.

As shown in FIGS. 1 and 2, the enterprise resource planning system 100 according to an embodiment of the present invention includes a first information management unit 110, a second information management unit 113; a third information management unit 115; a resolution management calendar providing unit 120; a slip management calendar providing unit 130; a petty cash calendar providing unit 140; a bill calendar providing unit 150; a card management calendar providing unit 160; a credit management calendar providing unit 170; and a profit/loss management calendar providing unit 180.

First, the enterprise resource planning system 100 is provided by an enterprise resource planning (ERP) program that is implemented inside the manager computer 1, in which each component may function as a module in the system or may be prepared in the form of a program to perform a specific program function.

The enterprise resource planning system 100 is installed in the form of a program in a memory device 10 inside the manager computer 1 to build the system, and builds an interface to interoperate with an input device 20, an output device 30, a computing device 40 and a control device 50 of the manager computer 1, thereby transmitting and receiving signals and data.

For example, in a case where a manager inputs a specific signal through the input device 20 such as a keyboard and a mouse, the input signal is transmitted to the enterprise resource planning system 100, for example, a pay sheet planning system 100 and is linked to execution of a specific step or a specific function.

Further, in a case where the specific step or the specific function is executed in the pay sheet planning system 100, the result may be transmitted to the output device 30 such as a display to be visually output as information.

Here, the pay sheet planning system 100 may be provided as a program itself installed in the memory device 10 inside the manager computer 1 as necessary, but this configuration is not limiting.

The first information management unit 110 stores and manages, as a database, resolution information that is generated to include a resolution creation date, a company name, a site name, a work type name, a resolution type selected as one of income or expenditure, an account subject, a customer name, a supply price, a value-added tax, a total amount, a payment method, and a resolution cost expected-execution date, on the basis of a resolution information input signal that is input through the input device 20 of the manager computer 1.

Here, the resolution information generated through the first information management unit 110 may additionally include a variety of information, such as a payment code related to bank account information linked to a cash transfer payment method, a payment code related to card identification information linked to a card payment method, personal information such as a rank and a name of a resolution creator, and a receipt issue date according to the resolution, as necessary.

The second information management unit 113 stores and manages, as a database, slip information that is generated to include a slip registration date, a company name, a site name, a work type name, a slip type selected as one of income or expenditure, an account subject, a customer name, a supply price, a value-added tax, a total amount, a payment method, and a slip cost expected-execution date, on the basis of resolution information, corresponding to a slip registration target selection signal that is input through the input device 20 of the manager computer 1, in the resolution information that is generated, stored and managed through the first information management unit 113.

Further, the slip information generated through the second information management unit 113 may additionally include a variety of information such as a payment code related to bank account information linked to a cash transfer payment method, a payment code related to card identification information linked to a card payment method, personal information such as a rank and a name of a slip registrant, and a slip receipt issue date, as necessary.

Thus, the manager may utilize various financial management functions using slips.

The third information management unit 115 stores and manages, as a database, real-time cash information that is generated from at least one of bank account information on a balance in at least one pre-registered bank account that is linked to a financial institution server to be provided with the bank account information such as an account balance upon request and cash-on-hold information that is generated on the basis of a cash-on-hold information input signal that is input through the input device 20 of the manager computer 1.

Thus, the manager may utilize various petty cash-related financial management functions necessary for understanding an actual cash condition.

Figure 3:
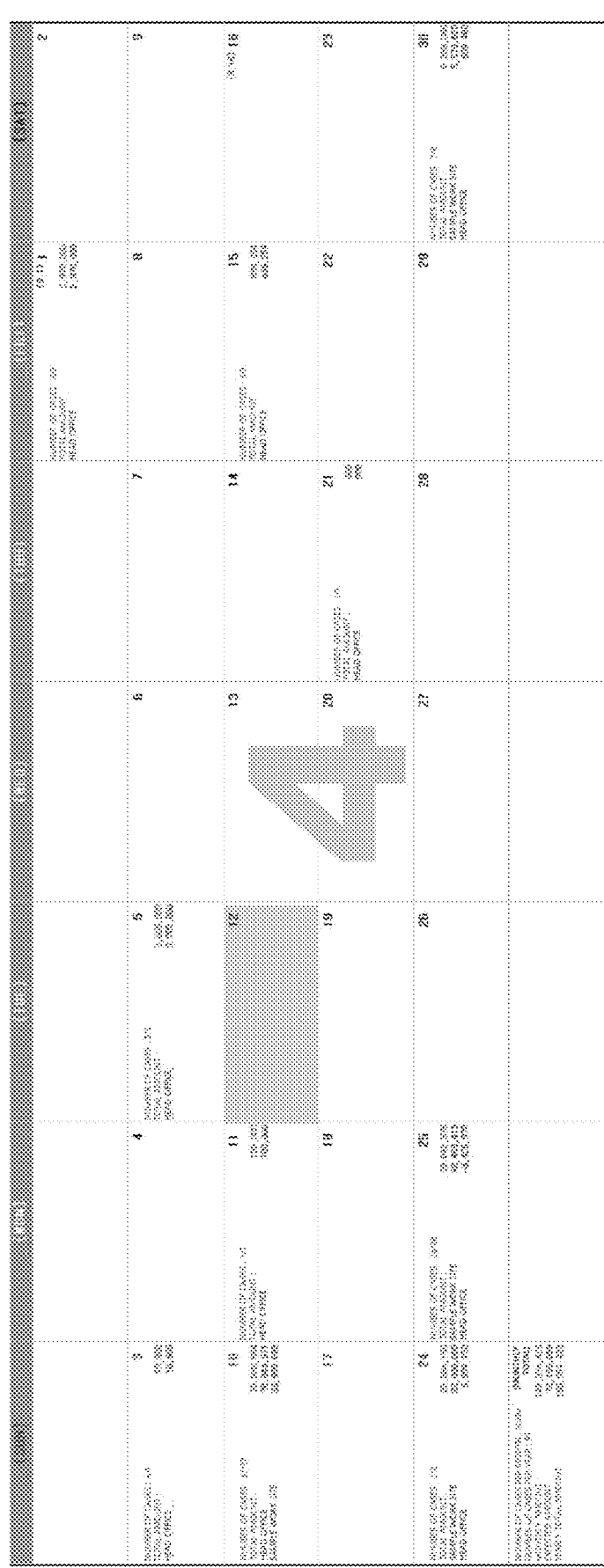

The resolution management calendar providing unit 120 outputs and provides, to the output device 30 of the manager computer 1, a calendar that displays the resolution information that is generated, stored and managed through the first information management unit 110 in correspondence with a resolution creation date or a resolution cost expected-execution date for each date in the calendar, as shown in FIG. 3.

To this end, the resolution management calendar providing unit 120 includes a first calendar generator 121, a first output standard information generator 122, a first information display 123, a first total information display 124, and a first report link 125.

First, the first calendar generator 121 generates a resolution management calendar including a plurality of first date sections having a first date display area and a first information display area, and a first total information section having a first monthly total information display area for the resolution information, as shown in FIG. 3.

Specifically, the plurality of first date sections having the first date display area and the first information display area in the resolution management calendar generated through the first calendar generator 121 are implemented as shown in FIG. 5, and the first total information section having the first monthly total information display area for resolution information is implemented as shown in FIG. 6.

Then, the first output standard information generator 122 generates resolution management calendar output standard information on the basis of a resolution management calendar output standard setting signal that is input through the input device 20 of the manager computer 1.

Specifically, the resolution management calendar output standard information includes information regarding a first resolution information output standard for determining which one of a resolution registration date and a resolution cost expected-execution date the resolution information is to be displayed on the basis of, information regarding a second resolution information output standard for determining which resolution type of an income and an expenditure the resolution information is to be displayed on the basis of, and information regarding a third resolution information output standard for determining which one of a site name, a work type name, an account subject and a customer name a specification of the resolution information is to be displayed on the basis of, for each first date section and each first total information section.

In order to perform the function for generating the resolution management calendar output standard information through the first output standard information generator 122, an area for inputting the resolution management calendar output standard setting signal is provided on one side of a program page where the resolution management calendar is provided, as shown in FIG. 4.

The resolution management calendar output standard information may vary according to how the resolution management output standard setting signal shown in FIG. 4 is input through selection within the input area, as necessary.

For example, in the case of FIG. 4, the first resolution information output standard is set on the basis of the resolution cost expected-execution date, the second resolution information output standard is set on the basis of the resolution type of the expenditure, and the third resolution information output standard is set on the basis of the site name to display the specification of the resolution information.

Accordingly, as shown in FIG. 5, the resolution information displayed in the first information display area is matched on the basis of the resolution cost expected-execution date for each date, and the content of the resolution in which the resolution type is the expenditure is displayed distinctly by the site name.

In this connection, the first information display 123 makes resolution information that satisfies the second resolution information output standard in the resolution information that is generated, stored and managed through the first information management unit 110 correspond to each date in the resolution management calendar according to the first resolution information output standard, on the basis of the resolution management calendar output standard information that is generated through the first output standard information generator 122.

Then, as shown in FIG. 5, the first information display 123 displays specification information on a total number of the resolution information corresponding to each date, a total amount, or a site name, a work type name, an account subject or a customer name-based total amount according to the third resolution information output standard, in each first information display area in the plurality of first date sections.

In addition, as shown in FIG. 6, the first total information display 124 correspondingly displays monthly resolution total information including information on a total number and a total amount of monthly resolution information in the first monthly total information display area in the first total information section, on the basis of the resolution information displayed in each of the plurality of first date sections through the first information display 123.

Here, the first information display 123 and the first total information display 124 reflect a difference between font colors of displayed items in information output display to help a user distinguish and check the content easily.

Thus, the manager may quickly and easily recognize information regarding the number of resolutions created for each date and a total cost related to the resolutions, and additionally, an overall resolution use state based on a specific month, through the resolution management calendar.

Finally, the first report link 125 provides, on the basis of an area selection signal in the resolution management calendar that is input through the input device 20 of the manager computer 1, a pop-up window having a different information output form according to an area corresponding to the area selection signal within the resolution management calendar.

For example, in a case where the area corresponding to the area selection signal in the resolution management calendar is the first information display area in the first date section for a specific date as shown in FIG. 5, the first report link 125 provides a separate pop-up window for outputting a resolution status report for the specific date.

In a case where the area corresponding to the area selection signal in the resolution management calendar is the first monthly total information display area in the first total information section as shown in FIG. 6, the first report link 125 provides a separate pop-up window for outputting a resolution status report for the specific date.

Further, in a case where the area corresponding to the area selection signal in the resolution management calendar is the first date display area in the first date section for the specific date as shown in FIG. 5, the first report link 125 provides a separate pop-up window for inputting/outputting resolution information that allows confirmation of a specification of resolution information displayed in the area and generation of resolution information based on the resolution information input signal that is input through the input device 20 of the manager computer 1.

An upper part of the pop-up window is an area for confirming a specification of resolution information, and a lower part thereof is an area for generating resolution information based on the resolution information input signal that is input through the input device 20 of the manager computer 1.

The slip management calendar providing unit 130 outputs and provides, to the output device 30 of the manager computer 1, a calendar that displays the slip information that is generated, stored and managed through the second information management unit 113 in correspondence with a slip registration date or a slip cost expected-execution date for each date in the calendar.

To this end, the slip management calendar providing unit 130 includes a second calendar generator 131, a second output standard information generator 132, a second information display 133, a second total information display 134, and a second report link 135.

Figure 7:
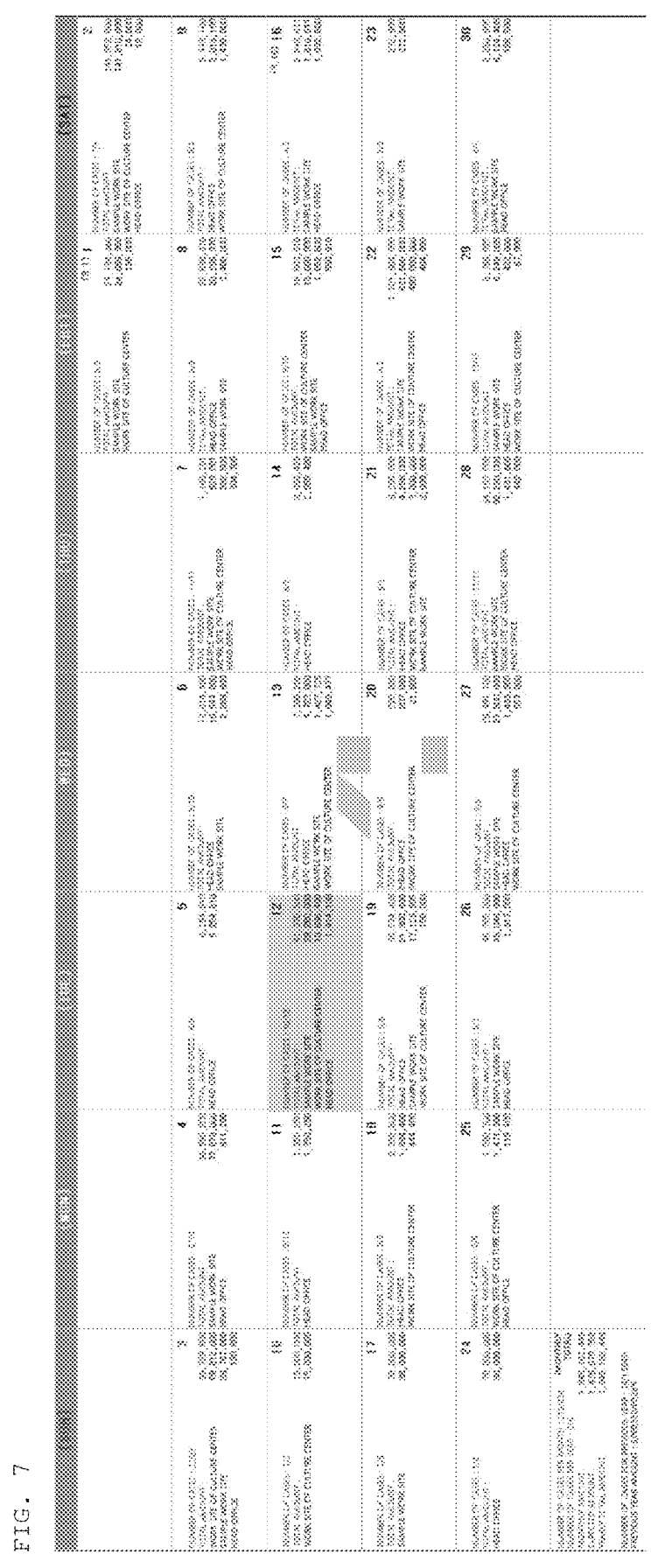

First, as shown in FIG. 7, the second calendar generator 131 generates a slip management calendar including a plurality of second date sections having a second date display area and a second information display area, and a second total information section having a second monthly total information display area for the slip information.

Specifically, the plurality of second date sections having the second date display area and the second information display area in the slip management calendar that is generated through the second calendar generator 131 are implemented as shown in FIG. 8, and the second total information section having the second monthly total information display area is implemented as shown in FIG. 9.

The second output standard information generator 132 generates slip management calendar output standard information on the basis of the slip management calendar output standard setting signal that is input through the input device 20 of the manager computer 1.

Here, the slip management calendar output standard information includes information regarding a first slip information output standard for determining which one of a slip registration date and a slip cost expected-execution date the slip information is to be displayed on the basis of, information regarding a second slip information output standard for determining which slip type of an income and an expenditure the slip information is to be displayed on the basis of, and information regarding a third slip information output standard for determining which one of a site name, a work type name, an account subject and a customer name a specification of the slip information is to be displayed on the basis of, for each second date section and each second total information section.

In order to perform the function for generating the slip management calendar output standard information through the second output standard information generator 132, an area for inputting the slip management calendar output standard setting signal is provided on one side of a program page where the slip management calendar is provided, as shown in FIG. 4.

In addition, the second information display 133 makes slip information that satisfies the second slip information output standard in the slip information that is generated, stored and managed through the second information management unit 113 correspond to each date in the slip management calendar according to the first slip information output standard, on the basis of the slip management calendar output standard information that is generated through the second output standard information generator.

Then, the second information display 133 displays specification information on a total number of the slip information corresponding to each date, a total amount thereof, or a site name, a work type name, an account subject or a customer name-based total amount according to the third slip information output standard, in each second information display area in the plurality of second date sections, as shown in FIG. 8.

In addition, the second total information display 134 correspondingly displays monthly slip total information including information on a total number and a total amount of monthly slip information in the second monthly total information display area in the second total information section, on the basis of the slip information displayed in each of the plurality of second date sections through the second information display, as shown in FIG. 9.

Here, the second information display 133 and the second total information display 134 reflect differences between fonts colors of displayed items in information output display to help a user easily distinguish and check the content.

Thus, the manager may quickly and easily check information on the number of slips created for each date and the cost for each item related to slips that satisfy predetermined conditions, and additionally, an overall slip use state on the basis of a specific month, through the slip management calendar.

Finally, the second report link 135 provides, on the basis of an area selection signal in the resolution management calendar that is input through the input device of the manager computer, a pop-up window having a different information output form according to an area corresponding to the area selection signal within the slip management calendar.

For example, in a case where an area corresponding to the area selection signal in the slip management calendar is the second information display area in the second date section for a specific date, the second report link 135 provides a separate pop-up window for outputting a slip ledger report for the specific date using slip information displayed in the area.

In addition, in a case where the area corresponding to the area selection signal in the slip management calendar is the second monthly total information display area in the second total information section, the second report link 135 provides a separate pop-up window for outputting a slip ledge status report for a specific month.

Further, in a case where the area corresponding to the area selection signal in the slip management calendar is the second date display area in the second date section for the specific date the second report link 135 provides a separate pop-up window for inputting/outputting slip information that allows confirmation of a specification of slip information displayed in the area and generation of slip information based on resolution information corresponding to the slip registration target selection signal that is input through the input device 20 of the manager computer 1.

An upper part of the pop-up window is an area for confirming a specification of slip information, and a lower part thereof is an area for providing a slip information registration function based on the slip registration target selection signal that is input through the input device 20 of the manager computer 1.

Here, in a case where a button for slip registration provided at a lower part thereof is clicked, a pop-up window is displayed. In this way, a user can select a slip registration target in the resolution information managed through preset registration through signal input to register the slip information.

The petty cash management calendar providing unit 140 generates petty cash information including information regarding a cash balance as of the previous day, a today's income cash amount, a today's expenditure cash amount, and a cash balance as of today, on the basis of slip information in which the payment method is set to cash transfer in the slip information that is generated, stored and managed through the second information management unit 113 and the real-time cash information that is generated, stored and managed through the third information management unit 115.

Subsequently, the petty cash management calendar providing unit 140 provides and outputs, to the output device 30 of the manager computer 1, a calendar that displays the generated petty cash information in correspondence with a slip registration date or a slip cost expected-execution date for each date in the calendar.

To this end, the petty cash management calendar providing unit 140 includes a third calendar generator 141, a third output standard information generator 142, a third information display 143, a third total information display 144, and a third report link 145.

Figure 10:
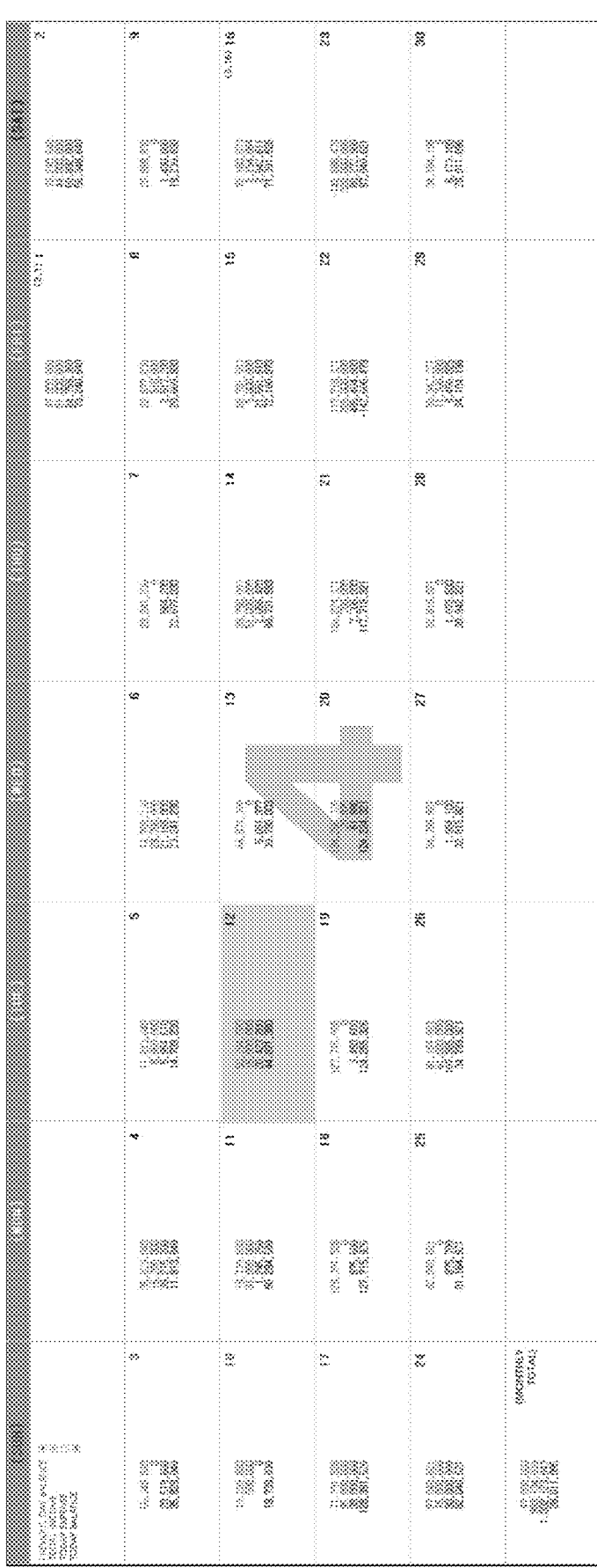
FIGS. 10 to 13 are reference diagrams for illustrating a management function providing form through a petty cash management calendar providing unit in the enterprise resource planning system according to the embodiment of the present invention.
Figure 11:
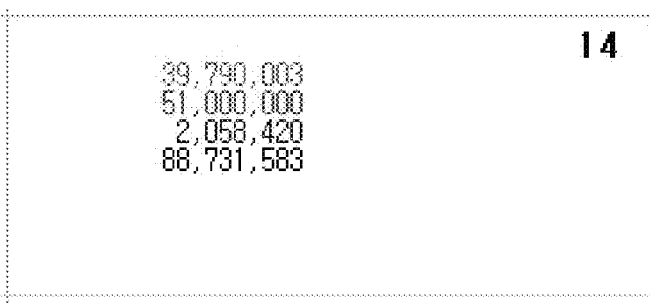
Figure 12:
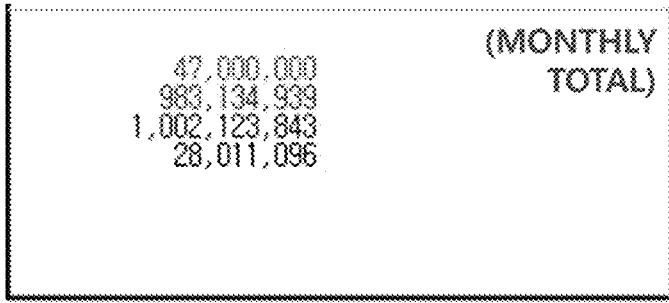

First, the third calendar generator 141 generates a petty cash management calendar including a plurality of third date sections having a third date display area and a third information display area as shown in FIG. 11, and a third total information section having a third monthly total information display area for the petty cash information as shown in FIG. 12, and the result is shown in FIG. 10

Then, the third output standard information generator 142 generates petty cash management calendar output standard information on the basis of the petty cash management calendar output standard setting signal that is input through the input device 20 of the manager computer 1.

Here, the petty cash calendar output standard information includes information regarding a first petty cash information output standard for determining which one of a slip registration date and a slip cost expected-execution date, in the slip information in which the payment method is set to cash transfer, the petty cash information is to be displayed on the basis of, and information regarding a second petty cash information output standard for determining which one of entire bank accounts and a specific bank account among at least one bank account managed by the third information management unit 115 the petty cash information is to be displayed on the basis of, for each third date section and each third total information section.

Figures 13, 14:
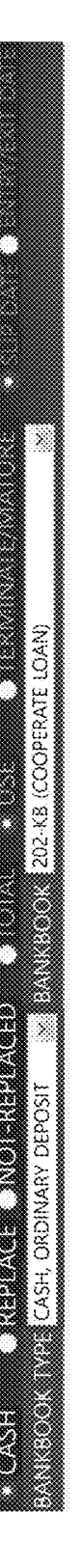
FIGS. 14 to 17 are reference diagrams for illustrating a management function providing form through a bill management calendar providing unit in the enterprise resource planning system according to the embodiment of the present invention.

In order to perform the function for generating the petty cash management calendar output standard information through the third output standard information generator 142, an area for inputting the petty cash management calendar output standard setting signal is provided on one side of a program page where the petty cash management calendar is provided, as shown in FIG. 13.

The petty cash management calendar output standard information may vary according to how the petty cash management output standard setting signal shown in FIG. 13 is input through selection within the input area, as necessary.

For example, in the case of FIG. 13, the standard for the first petty cash information output standard is set on the basis of the slip registration date, and the second petty cash information output standard is set on the basis of a bank account corresponding to a code of "202-KB bank (cooperate loan) to display a specification of a petty cash.

Accordingly, as shown in FIG. 11, the petty cash information displayed in the third information display area is matched by date on the basis of the slip registration date, and petty cash information including information regarding a cash balance as of the previous day, a today's income cash amount, a today's expenditure cash amount, and a cash balance as of today for the bank account corresponding to the code of the 202-KB (cooperate loan).

In addition, the third information display 143 makes slip information that satisfies the second petty cash information output standard in the slip information that is generated, stored and managed through the second information management unit 113, in which the payment method is set to cash transfer, correspond to each date in the petty cash management calendar according to the first petty cash information output standard, on the basis of the petty cash management calendar output standard information that is generated through the third output standard information generator.

Subsequently, the third information display 143 displays the petty cash information corresponding to each date in each third information display area within the plurality of third date sections.

Here, it is desirable that the third information display 143 displays the variety of information regarding the cash balance as of the previous day, the today's income cash amount, the today's expenditure cash amount, and the cash balance as of today in the petty cash information displayed in each of the third display area in the plurality of third date sections with different colors so that they can be distinguished from each other, as shown in FIG. 11.

In addition, the third total information display 144 correspondingly displays monthly petty cash total information including information on a total amount of specifications of the monthly petty cash information in a third monthly total information display area in the third total information section, on the basis of the petty cash information displayed in each of the plurality of third date sections through the third information display 143, as shown in FIG. 12.

Finally, the third report link 145 provides, on the basis of an area selection signal in the petty cash management calendar that is input through the input device of the manager computer, a pop-up window having a different information output form according to an area corresponding to the area selection signal within the petty cash management calendar.

For example, in a case where the area corresponding to the area selection signal in the petty cash management calendar is the third information display area in the third date section for a specific date, the third report link 145 provides a separate pop-up window for outputting a cashbook report for the specific date using the petty cash information displayed in the area.

In addition, in a case where the area corresponding to the area selection signal in the petty cash management calendar is the third monthly total information display area in the third total information section, the third report link 145 provides a separate pop-up window for outputting a cashbook report for a specific month.

Further, in a case where the area corresponding to the area selection signal in the petty cash management calendar is the third date display area in the third date section for the specific date, the third report link 145 provides the same pop-up window as the pop-up window that is provided through the second report link 135 through the same link path.

The bill management calendar providing unit 150 outputs and provides, to the output device 30 of the manager computer 1, a calendar that displays promissory information including information regarding a bill as of the previous day, a today's bill issue amount, a today's bill payment amount, and a bill balance as of today, in correspondence with the slip registration date or the slip cost expected-execution date for each date in the calendar, on the basis of slip information in which the payment method is set to bills in the slip information that is generated, stored and managed through the second information management unit 113.

To this end, the bill management calendar providing unit 150 includes a fourth calendar generator 151, a fourth output standard information generator 152, a fourth information display 153, a fourth total information display 154, and a fourth report link 155.

Figures 15, 16, 17:

First, the fourth calendar generator 151 generates a bill management calendar (as shown in FIG. 14) including a plurality of fourth date sections having a fourth date display area and a fourth information display area as shown in FIG. 15, and a fourth total information section having a fourth monthly total information display area for the bill information as shown in FIG. 16.

Next, the fourth output standard information generator 152 generates bill management calendar output standard information on the basis of the bill management calendar output standard setting signal that is input through the input device 20 of the manager computer 1.

Here, the bill management calendar output standard information includes information regarding a first bill information output standard for determining which one of a slip registration date and a slip cost expected-execution date, in the slip information in which the payment method is set to a bill, the bill information is to be displayed on the basis of, and information regarding a second bill information output standard for determining which bill type of an income related to bills-receivable and an expenditure related to bills-payable in the slip information the bill information is to be displayed on the basis of, for each fourth date section and each fourth total information section.

In order to perform the function for generating the bill management calendar output standard information through the fourth output standard information generator 152, an area for inputting the bill management calendar output standard setting signal is provided on one side of a program page where the bill management calendar is provided, as shown in FIG. 17.

The bill management calendar output standard information may vary according to how the bill management output standard setting signal shown in FIG. 17 is input through selection within the input area, as necessary.

For example, in the case of FIG. 17, the first bill information output standard is set on the basis of the slip registration date, and the second bill information output standard is set on the basis of the slip information in which the slip type is the expenditure related to bills-payable to display the specification of the slip information.

Accordingly, as shown in FIG. 15, the bill information displayed in the fourth information display area is matched by date on the basis of the slip registration date, in which bill information including information regarding a bill balance as of the previous day, a today's bill issue amount, a today's bill payment amount, and a bill balance as of today is displayed on the basis of the slip information in which the slip type is the expenditure related to bills-payable.

In addition, the fourth information display 153 displays, while making slip information that satisfies the second bill information output standard in the slip information that is generated, stored and managed through the second information management unit 113, in which the payment method is set to bills, correspond to each date in the bill management calendar according to the first bill information output standard, bill information corresponding to each date in each fourth information display area in the plurality of fourth date sections, on the basis of the bill management calendar output standard information that is generated through the fourth output standard information generator 152.

Here, it is desirable that the fourth information display 153 displays the variety of information regarding the bill balance as of the previous day, the today's bill issue amount, the today's bill payment amount, and the bill balance as of today in the bill information displayed in the fourth display areas in the plurality of fourth date sections with different colors so that they can be distinguished from each other, as shown in FIG. 15.

In addition, the fourth total information display 154 correspondingly displays monthly bill total information including information on a total amount of specifications of monthly bill information in the fourth monthly total information display area in the fourth total information section, on the basis of the bill information displayed in each of the plurality of fourth date sections through the fourth information display 153, as shown in FIG. 16.

The fourth report link 155 provides, on the basis of an area selection signal in the bill management calendar that is input through the input device 20 of the manager computer 1, a pop-up window having a different information output form according to an area corresponding to the area selection signal within the bill management calendar.

For example, in a case where the area corresponding to the area selection signal in the bill management calendar is the fourth information display area in the fourth date section for a specific date, the fourth report link 155 provides a separate pop-up window for outputting a bill state report for the specific date using bill information displayed in the area.

In addition, in a case where the area corresponding to the area selection signal in the bill management calendar is the fourth monthly total information display area in the fourth total information section, the fourth report link 155 provides a separate pop-up window for outputting a bill ledger report for a specific month.

Further, in a case where the area corresponding to the area selection signal in the bill management calendar is the fourth date display area in the fourth date section for the specific date, the fourth report link 155 provides the same pop-up window as the pop-up window that is provided through the second report link 135 through the same link path.

The card management calendar providing unit 160 outputs and provides, to the output device 30 of the manager computer 1, a calendar that displays card information including information regarding a card balance as of the previous day, a today's card payment slip issue amount, a today's card payment amount, and a card balance as of today, in correspondence with the slip registration date or the slip cost expected-execution date for each date in the calendar, on the basis of slip information in which the payment method is set to cards in the slip information that is generated, stored and managed through the second information management unit 113.

To this end, the card management calendar providing unit 160 includes a fifth calendar generator 161, a fifth output standard information generator 162, a fifth information display 163, a fifth total information display 164, and a fifth report link 165.

Figure 18:
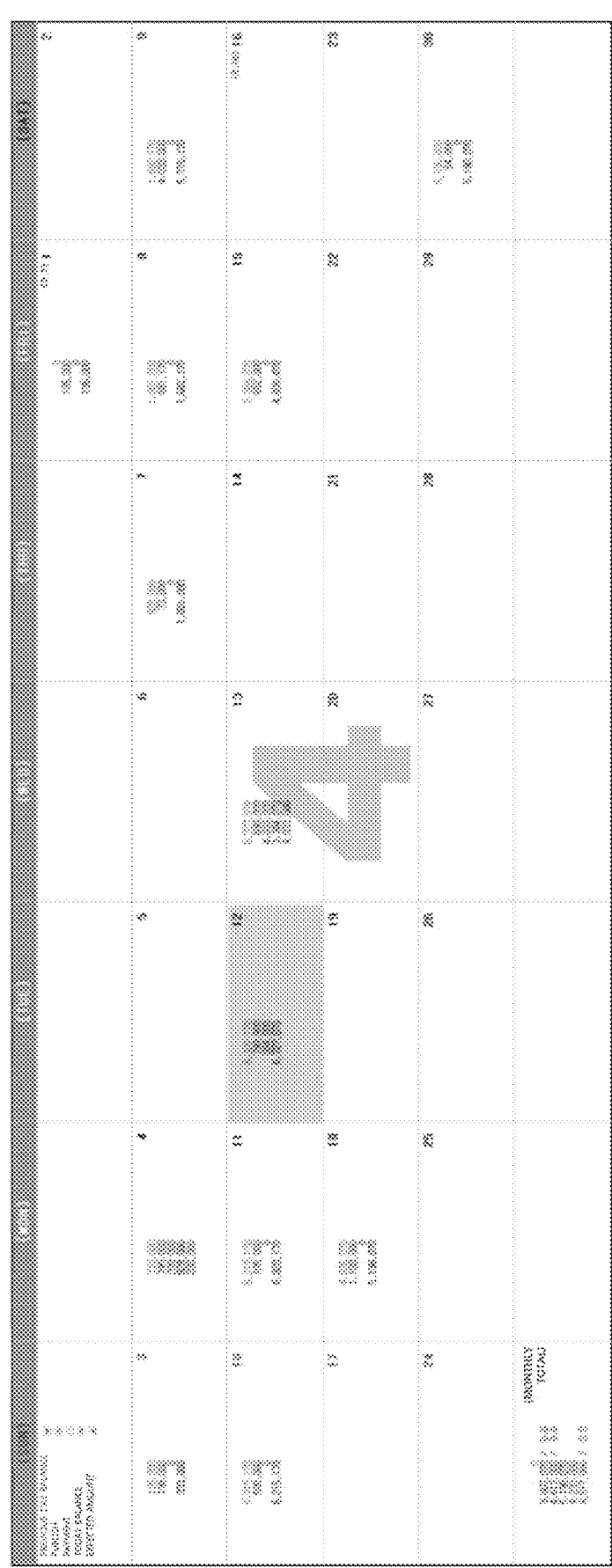
FIGS. 18 to 21 are reference diagrams for illustrating a management function providing form through a card management calendar providing unit in the enterprise resource planning system according to the embodiment of the present invention.
Figure 19:
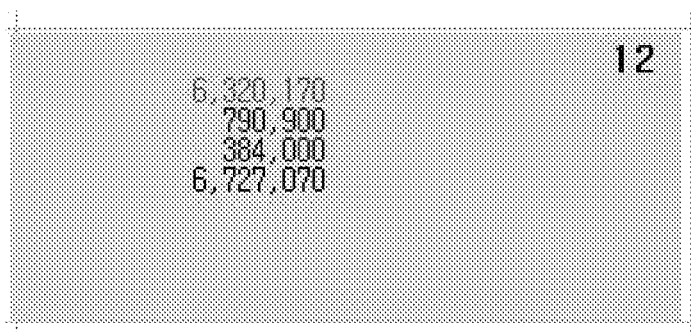

First, the fifth calendar generator 161 generates a card management calendar including a plurality of fifth date sections having a fifth date display area and a fifth information display area as shown in FIG. 19, and a fifth total information section having a fifth monthly total information display area for the card information as shown in FIG. 18.

Then, the fifth output standard information generator 162 generates card management calendar output standard information on the basis of the card management calendar output standard setting signal that is input through the input device 20 of the manager computer 1.

Here, the card management calendar output standard information includes information regarding a first card information output standard for determining which one of a slip registration date and a slip cost expected-execution date, in the slip information in which the payment method is set to cards, the card information is to be displayed on the basis of, information regarding a second card information output standard for determining which slip type of an income and an expenditure in the slip information the card information is to be displayed on the basis of, and information regarding a third card information output standard for determining which one of entire cards and a specific card, in card identification information of slip information in which the payment method is set to cards, the card information is to be displayed on the basis of, for each fifth date section and each fifth total information section.

Figures 21, 22:
FIGS. 22 to 24 are reference diagrams for illustrating a management function providing form through a credit management calendar providing unit in the enterprise resource planning system according to the embodiment of the present invention.

In order to perform the function for generating the card management calendar output standard information through the fifth output standard information generator 162, an area for inputting the card management calendar output standard setting signal is provided on one side of a program page where the card management calendar is provided, as shown in FIG. 21.

The card management calendar output standard information may vary according to how the card management output standard setting signal shown in FIG. 21 is input through selection within the input area, as necessary.

For example, in the case of FIG. 21, the first card information output standard is set on the basis of the slip registration date, the second card information output standard is set on the basis of the slip type of the expenditure, and the third card information output standard is set to display specifications for the entire pre-registered cards.

Accordingly, as shown in FIG. 19, the card information displayed in the fifth information display area is matched by date on the basis of the slip registration date, in which card information including information regarding a card balance as of the previous day, a today's card payment slip issue amount, a today's card payment amount, and a card balance as of today is displayed for the pre-registered entire cards on the basis of the slip information in which the slip type is an expenditure.

In addition, the fifth information display 163 makes slip information that satisfies the second card information output standard and the third card information output standard in the slip information that is generated, stored and managed through the second information management unit 113, in which the payment method is set to cards, correspond to each date in the card management calendar according to the first card information output standard, on the basis of the card management calendar output standard information that is generated through the fifth output standard information generator 162.

Subsequently, the fifth information display 163 displays the card information corresponding to each date in each fifth information display area in the plurality of fifth date sections, as shown in FIG. 19.

Here, it is desirable that the fifth information display 163 displays the variety of information regarding the card balance as of the previous day, the today's card payment slip issue amount, the today's card payment amount, and the card balance as of today in the card information displayed in each of the fifth display area in the plurality of fifth date sections with different colors so that they can be distinguished from each other, as shown in FIG. 19.

Figure 20:
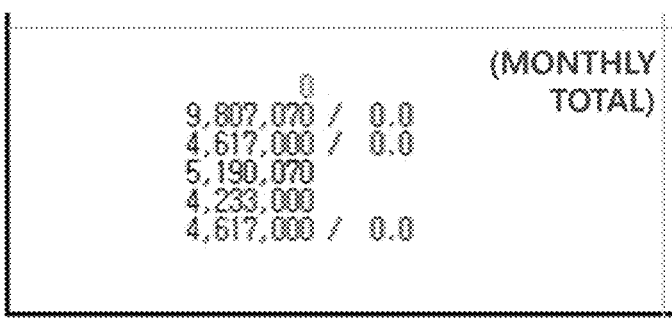

In addition, the fifth total information display 164 correspondingly displays monthly card total information including information on a total amount of specifications of the monthly card information in a fifth monthly total information display area in the fifth total information section, on the basis of the card information displayed in each of the plurality of fifth date sections through the fifth information display 163, as shown in FIG. 20.

Finally, the fifth report link 165 provides, on the basis of an area selection signal in the card management calendar that is input through the input device 20 of the manager computer 1, a pop-up window having a different information output form according to an area corresponding to the area selection signal within the card management calendar.

For example, in a case where the area corresponding to the area selection signal in the card management calendar is the fifth information display area in the fifth date section for a specific date, the fifth report link 165 provides a separate pop-up window for outputting a credit card purchase status report or a credit card sales status report for the specific date using the card information displayed in the area.

Further, in a case where the area corresponding to the area selection signal in the card management calendar is the fifth date display area in the fifth monthly date section, the fifth report link 165 provides a separate pop-up window for outputting a credit card purchase status report or a credit card sales status report for a specific month.

In addition, in a case where the area corresponding to the area selection signal in the card management calendar is the fifth date display area in the fifth date section for the specific date, the fifth report link 165 provides the same pop-up window as the pop-up window that is provided through the second report link 135 through the same link path.

The credit management calendar providing unit 170 outputs and provides, to the output device 30 of the manager computer 1, a calendar that displays credit information including information regarding a credit balance as of the previous day, a today's credit payment slip issue amount, a today's credit payment amount, and a credit balance as of today, in correspondence with the slip registration date or the slip cost expected-execution date for each date in the calendar, on the basis of slip information in which the payment method is set to credit in the slip information that is generated, stored and managed through the second information management unit 113.

To this end, the credit management calendar providing unit 170 includes a sixth calendar generator 171, a sixth output standard information generator 172, a sixth information display 173, a sixth total information display 174, and a sixth report link 175.

First, as shown in FIG. 22, the sixth calendar generator 171 generates a credit management calendar including a plurality of sixth date sections having a sixth date display area and a sixth information display area, as shown in FIG.

Figure 24:
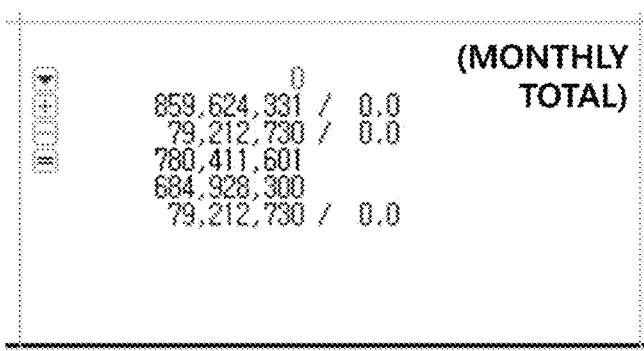

23, and a sixth total information section having a sixth monthly total information display area for credit information, as shown in FIG. 24.

Then, the sixth output standard information generator 172 generates credit management calendar output standard information on the basis of a credit management calendar output standard setting signal that is input through the input device 20 of the manager computer 1.

Here, the credit management calendar output standard information includes information regarding a first credit information output standard for determining which one of a slip registration date and a slip cost expected-execution date the slip information in which the payment method is set to credit is to be displayed on the basis of, and information regarding a second credit information output standard for determining which slip type of an income and an expenditure in the slip information credit information is to be displayed on the basis of, for each sixth date section and each sixth total information section.

In order to perform the function for generating the credit management calendar output standard information through the sixth output standard information generator 172, an area for inputting the credit management calendar output standard setting signal is provided on one side of a program page where the credit management calendar is provided, as shown in FIG. 21.

In addition, the sixth information display 173 that displays, while making slip information that satisfies the second credit information output standard in the slip information that is generated, stored and managed through the second information management unit 113, in which the payment method is set to credit, correspond to each date in the credit management calendar according to the first credit information output standard, the credit information corresponding to each date in each sixth information display area in the plurality of sixth date sections, on the basis of the credit management calendar output standard information that is generated through the sixth output standard information generator 172.

Figure 23:
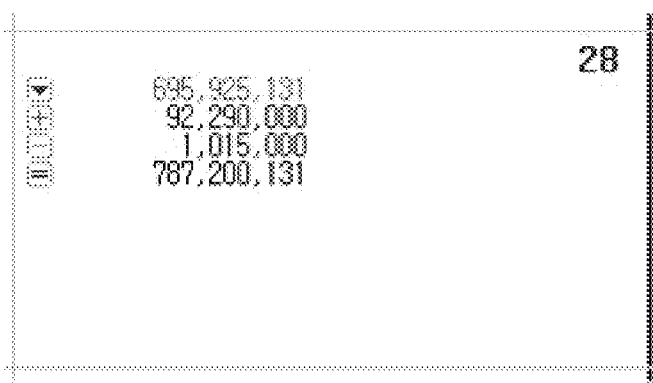

Here, it is desirable that the sixth information display 173 displays the variety of information regarding the credit balance as of the previous day, the today's credit payment slip issue amount, the today's credit payment amount, and the credit balance as of today in the credit information displayed in each of the sixth display area in the plurality of sixth date sections with different colors so that they can be distinguished from each other, as shown in FIG. 23.

In addition, the sixth total information display 174 correspondingly displays monthly credit total information including information on a total amount of specifications of the monthly credit information in a sixth monthly total information display area in the sixth total information section, on the basis of the credit information displayed in each of the plurality of sixth date sections through the sixth information display 173, as shown in FIG. 24.

Finally, the sixth report link 175 provides, on the basis of an area selection signal in the credit management calendar that is input through the input device of the manager computer, a pop-up window having a different information output form according to an area corresponding to the area selection signal within the credit management calendar.

For example, in a case where the area corresponding to the area selection signal in the credit management calendar is the sixth information display area in the sixth date section for a specific date, the sixth report link 175 provides a separate pop-up window for outputting a credit purchase ledger report or a credit sales ledger report for the specific date using the credit information displayed in the area.

In addition, in a case where the area corresponding to the area selection signal in the credit management calendar is the sixth monthly total information display area in the sixth total information section, the sixth report link 175 provides a separate pop-up window for outputting a total unpaid state report for a specific month.

Further, in a case where the area corresponding to the area selection signal in the credit management calendar is the sixth date display area in the sixth date section for the specific date, the sixth report link 175 provides the same pop-up window as the pop-up window that is provided through the second report link 135 through the same link path.

Figure 25:
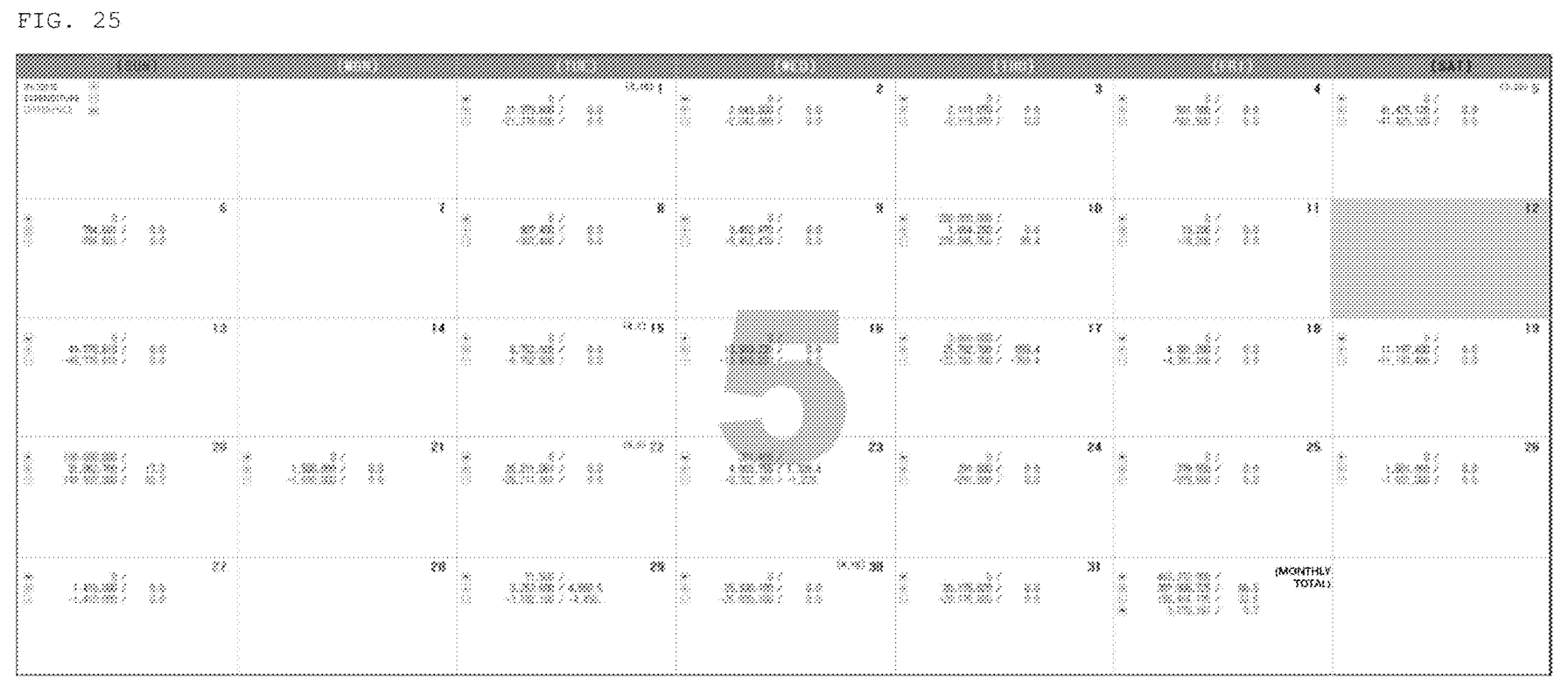

The profit/loss management calendar providing unit 180 outputs and provides, to the output device 30 of the manager computer 1, a calendar that displays profit/loss information including information regarding a total income corresponding to a total amount of slips of an income type, information regarding a total expenditure corresponding to a total amount of slips of an expenditure type, and information regarding a margin between the total income and the total expenditure, in correspondence with a slip registration date or a slip cost expected-execution date for each date in the calendar, on the basis of the slip information that is generated, stored and managed through the second information management unit 113, as shown in FIG. 25.

To this end, the profit/loss management calendar providing unit 180 includes a seventh calendar generator 181, a seventh output standard information generator 182, a seventh information display 183, a seventh total information display 184, and a seventh report link 185.

Figure 26:
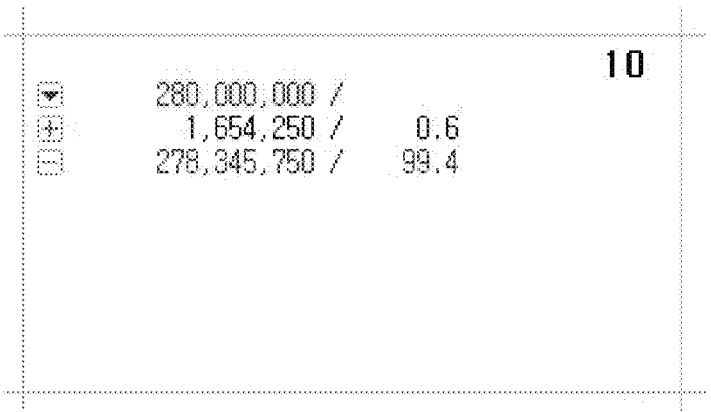
Figure 27:
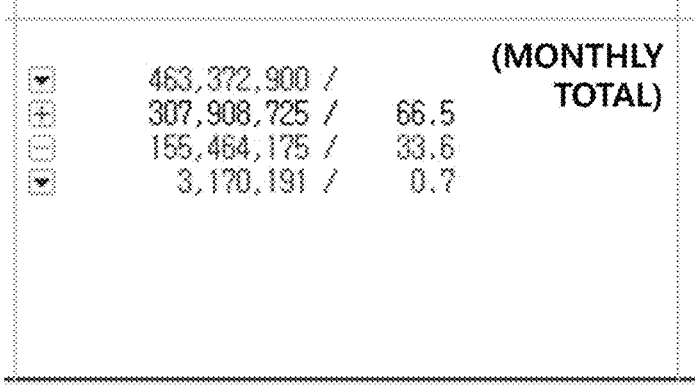

Here, as shown in FIG. 25, the seventh calendar generator 181 generates a credit management calendar including a plurality of seventh date sections having a seventh date display area and a seventh information display area, as shown in FIG. 26, and a seventh total information section having a seventh monthly total information display area for credit information, as shown in FIG. 27.

Then, the seventh output standard information generator 182 generates profit/loss management calendar output standard information on the basis of a credit management calendar output standard setting signal that is input through the input device 20 of the manager computer 1.

Here, the profit/loss management calendar output standard information includes information regarding a first profit/loss information output standard for determining which one of a slip registration date and a slip cost expected-execution date in the slip information the profit/loss information is to be displayed on the basis of, information regarding a second profit/loss information output standard for determining which one of a date-based display and a month-based date-cumulative display the profit/loss information is to be displayed on the basis of, information regarding a third profit/loss information output standard for determining whether to display an increase/decrease ratio compared to the previous day in at least one of a total income, a total expenditure, and a difference between the total income and the total expenditure in the slip information, information regarding a fourth profit/loss information output standard for determining whether to display information on at least one of an increase/decrease ratio of the total expenditure to the total income and an increase/decrease ratio of the difference between the total income and the total expenditure in the slip information, and information regarding a fifth profit/loss information output standard for determining which of a supply price, a value-added tax, or a total amount of the supply value and the value-added tax in the slip information the total income, the total expenditure, and the difference between the total income and total expenditure are to be displayed on the basis, for each seventh date section and each seventh total information section.

Figure 28:

In order to perform the function for generating the profit/loss management calendar output standard information through the seventh output standard information generator 182, an area for inputting the profit/loss management calendar output standard setting signal is provided on one side of a program page where the profit/loss management calendar is provided, as shown in FIG. 28.

The profit/loss management calendar output standard information may vary according to how the profit/loss management output standard setting signal shown in FIG. 28 is input through selection within the input area, as necessary.

For example, in the case of FIG. 28, the first profit/loss information output standard is set on the basis of the slip registration date, the second profit/loss information output standard is set on the basis of daily profit/loss to distinctly display the profit/loss information for each date, the information based on the third profit/loss information output standard and the information based on the fourth profit/loss information output standard are not displayed, and the total income, the total expenditure, and the difference between the total income and the total expenditure according to the fifth profit/loss information output standard are displayed on the basis of the supply price.

In addition, the seventh information display 183 generates profit/loss information by computing the slip information that is generated, stored and managed through the second information management unit 113 according to the third profit/loss output standard to the fifth profit/loss information output standard, on the basis of the profit/loss management calendar output standard information that is generated through the seventh output standard information generator 182.

Subsequently, the seventh information display 183 displays, while making the profit/loss information correspond to each date in the profit/loss management calendar according to the first profit/loss information output standard and the second profit/loss information output standard, the profit/loss information corresponding to each date in each seventh information display area in the plurality of seventh date sections.

Here, it is desirable that the seventh information display 183 displays the variety of information regarding the total income, the total expenditure, and the difference between the total income and the total expenditure in the profit/loss displayed in each of the seventh display area in the plurality of seventh date sections with different colors so that they can be distinguished from each other, as shown in FIG. 26.

In addition, the seventh total information display 184 correspondingly displays monthly profit/loss total information including information on a total amount of specifications of monthly profit/loss information in a (the 청구항) seventh monthly total information display area in the seventh total information section, on the basis of the profit/loss information displayed in each of the plurality of seventh date sections through the seventh information display 183, as shown in FIG. 27.

Finally, the seventh report link 185 provides, on the basis of an area selection signal in the profit/loss management calendar that is input through the input device of the manager computer, a pop-up window having a different information output form according to an area corresponding to the area selection signal within the profit/loss management calendar.

For example, in a case where an area corresponding to the area selection signal in the profit/loss management calendar is the seventh information display area in the seventh date section for a specific date, the seventh report link 185 provides a separate pop-up window for outputting a profit/loss ledger report using profit/loss information displayed in the area.

Further, in a case where the area corresponding to the area selection signal in the profit/loss management calendar is the seventh monthly total information display area in the seventh total information section, the seventh report link 185 provides a separate pop-up window for outputting a profit/loss status report for a specific month.

In addition, in a case where the area corresponding to the area selection signal in the profit/loss management calendar is the seventh date display area in the seventh date section for the specific date, the seventh report link 185 provides the same pop-up window as the pop-up window provided through the second report link 135 through the same link path.

The above-described structural features of the first information management unit 110, the second information management unit 113, the third information management unit 115, the resolution management calendar providing unit 120, the slip management information calendar providing unit 130, the petty cash management calendar providing unit 140, the bill management calendar providing unit 150, the card management calendar providing unit 160, the credit management calendar providing unit 170, and the profit/loss management calendar providing unit 180 in the enterprise resource planning system 100 may be implemented as a computer-readable recording medium on which the enterprise resource planning (ERP) program having the enterprise resource planning method or the enterprise resource management functions performed by the system is recorded, in this case, the above components may be provided in correspondence with their methodological characteristics or functional characteristics.

Accordingly, in the enterprise resource planning method of the present invention, detailed method roles performed step by step correspond to the detailed components and roles of the enterprise resource planning system 100.

In addition, the computer-readable recording medium on which the enterprise resource planning (ERP) program having the enterprise resource management functions of the present invention is recorded has detailed functional roles that correspond to the detailed components and role of the enterprise resource planning system 100.

The embodiments disclosed in this description are not intended to limit but illustrate the technical idea of the present invention, and the scope of the technical idea of the present invention is not limited by these embodiments. The scope of protection should be interpreted in accordance with claims, and all technical ideas within the equivalent scope should be interpreted as being included in the scope of the present invention.

EXPLANATION OF SYMBOLS

1: MANAGER COMPUTER
10: MEMORY DEVICE
20: INPUT DEVICE
30: OUTPUT DEVICE

40: COMPUTING DEVICE
50: CONTROL DEVICE
100: ENTERPRISE RESOURCE PLANNING SYSTEM
110: FIRST INFORMATION MANAGEMENT UNIT
113: SECOND INFORMATION MANAGEMENT UNIT
115: THIRD INFORMATION MANAGEMENT UNIT
120: RESOLUTION MANAGEMENT CALENDAR PROVIDING UNIT
121: FIRST CALENDAR GENERATOR
122: FIRST OUTPUT STANDARD INFORMATION GENERATOR
123: FIRST INFORMATION DISPLAY
124: FIRST TOTAL INFORMATION DISPLAY
125: FIRST REPORT LINK
130: SLIP MANAGEMENT CALENDAR PROVIDING UNIT
131: SECOND CALENDAR GENERATOR
132: SECOND OUTPUT STANDARD INFORMATION GENERATOR
133: SECOND INFORMATION DISPLAY
134: SECOND TOTAL INFORMATION DISPLAY
135: SECOND REPORT LINK
140: PETTY CASH MANAGEMENT CALENDAR PROVIDING UNIT
141: THIRD CALENDAR GENERATOR
142: THIRD OUTPUT STANDARD INFORMATION GENERATOR
143: THIRD INFORMATION DISPLAY
144: THIRD TOTAL INFORMATION DISPLAY
145: THIRD REPORT LINK
150: BILL MANAGEMENT CALENDAR PROVIDING UNIT
151: FOURTH CALENDAR GENERATOR
152: FOURTH OUTPUT STANDARD INFORMATION GENERATOR
153: FOURTH INFORMATION DISPLAY
154: FOURTH TOTAL INFORMATION DISPLAY
155: FOURTH REPORT LINK
160: CARD MANAGEMENT CALENDAR PROVIDING UNIT
161: FIFTH CALENDAR GENERATOR
162: FIFTH OUTPUT STANDARD INFORMATION GENERATOR
163: FIFTH INFORMATION DISPLAY
164: FIFTH TOTAL INFORMATION DISPLAY
165: FIFTH REPORT LINK
170: CREDIT MANAGEMENT CALENDAR PROVIDING UNIT
171: SIXTH CALENDAR GENERATOR
172: SIXTH OUTPUT STANDARD INFORMATION GENERATOR
173: SIXTH INFORMATION DISPLAY
174: SIXTH TOTAL INFORMATION DISPLAY
175: SIXTH REPORT LINK
180: PROFIT/LOSS MANAGEMENT CALENDAR PROVIDING UNIT
181: SEVENTH CALENDAR GENERATOR
182: SEVENTH OUTPUT STANDARD INFORMATION GENERATOR
183: SEVENTH INFORMATION DISPLAY
184: SEVENTH TOTAL INFORMATION DISPLAY
185: SEVENTH REPORT LINK

The invention claimed is:

1. An enterprise resource planning system having a financial management function using a computer-implemented calendar, the system being implemented on a manager computer, comprising:

a memory of the manager computer storing an enterprise resource planning (ERP) program; and at least one processor of the manager computer operatively coupled to the memory, the processor being configured to execute the ERP program to implement;

a first information management unit configured to store and manage, as a database, resolution information that is generated to include a resolution creation date, a company name, a site name, a work type name, a resolution type selected as one of income or expenditure, an account subject, a customer name, a supply price, a value-added tax, a total amount, a payment method, and a resolution cost expected-execution date, based on a resolution information input signal that is received through an input device of the manager computer;

a second information management unit configured to store and manage, as a database, slip information that is generated to include a slip registration date, a company name, a site name, a work type name, a slip type selected as one of income or expenditure, an account subject, a customer name, a supply price, a value-added tax, a total amount, a payment method, and a slip cost expected-execution date, based on resolution information corresponding to a slip registration target selection signal that is input through the input device of the manager computer, in the resolution information stored by the first information management unit;

a third information management unit configured to store and manage, as a database, real-time cash information that is generated from at least one of bank account information regarding a balance in at least one pre-registered bank account that is linked to a financial institution server to be provided upon request, and cash-on-hold information that is generated based on a cash-on-hold information input signal that is input through the input device of the manager computer;

a resolution management calendar providing unit configured to output and provide, to an output device of the manager computer, a calendar that displays the resolution information stored by the first information management unit in correspondence with a resolution creation date or a resolution cost expected-execution date for each date in the calendar;

a slip management calendar providing unit configured to output and provide, to the output device of the manager computer, a calendar that displays the slip information stored by the second information management unit in correspondence with a slip registration date or a slip cost expected-execution date for each date in the calendar; and a petty cash management calendar providing unit configured to output and provide, to the output device of the manager computer, a calendar that displays petty cash information including information regarding a cash balance as of a previous day, a today's income cash amount, a today's expenditure cash amount, and a cash balance as of today, in correspondence with the slip registration date or the slip cost expected-execution date for each date in the calendar, based on slip information in which the payment method is set to cash transfer, the slip information being stored by the second information management unit, and on the real-time cash information stored by the third information management unit.

2. The system according to claim 1, wherein the at least one processor is further configured to execute the ERP program to implement:

a bill management calendar providing unit configured to output and provide, to the output device of the manager computer, a calendar that displays promissory information including information regarding a bill as of the previous day, a today's bill payment amount, and a bill balance as of today, in correspondence with the slip registration date or the slip cost expected-execution date for each date in the calendar, based on slip information stored by the second information management unit in which the payment method is set to bills;

a card management calendar providing unit configured to output and provide, to the output device of the manager computer, a calendar that displays card information including information regarding a card balance as of the previous day, a today's card payment slip issue amount, a today's card payment amount, and a card balance as of today, in correspondence with the slip registration date or the slip cost expected-execution date for each date in the calendar, based on slip information stored by the second information management unit in which the payment method is set to cards;

a credit management calendar providing unit configured to output and provide, to the output device of the manager computer, a calendar that displays credit information including information regarding a credit balance as of the previous day, a today's credit payment slip issue amount, a today's credit payment amount, and a credit balance as of today, in correspondence with the slip registration date or the slip cost expected-execution date for each date in the calendar, based on slip information stored by the second information management unit in which the payment method is set to credit; and a profit/loss management calendar providing unit configured to output and provide, to the output device of the manager computer, a calendar that displays profit/loss information including information regarding a total income corresponding to a total amount of slips of an income type, information regarding a total expenditure corresponding to a total amount of slips of an expenditure type, and information regarding a margin between the total income and the total expenditure, in correspondence with the slip registration date or the slip cost expected-execution date for each date in the calendar, based on slip information stored by the second information management unit.

3. The system according to claim 2, wherein the resolution management calendar providing unit comprises:

a first calendar generator that generates a resolution management calendar including a plurality of first date sections having a first date display area and a first information display area, and a first total information section having a first monthly total information display area for the resolution information;

a first output standard information generator that generates resolution management calendar output standard information including information regarding a first resolution information output standard for determining which one of a resolution registration date and a resolution cost expected-execution date the resolution information is to be displayed on the basis of, information regarding a second resolution information output standard for determining which resolution type of an income and an expenditure the resolution information is to be displayed on the basis of, and information regarding a third resolution information output standard for determining which one of a site name, a work type name, an account subject and a customer name a specification of the resolution information is to be displayed on the basis of, for each first date section and each first total information section, on the basis of a resolution management calendar output standard setting signal that is input through the input device of the manager computer;

a first information display that displays, while making resolution information that satisfies the second resolution information output standard in the resolution information that is generated, stored and managed through the first information management unit correspond to each date in the resolution management calendar according to the first resolution information output standard, specification information on a total number of the resolution information corresponding to each date, a total amount, or a site name, a work type name, an account subject or a customer name-based total amount according to the third resolution information output standard, in each first information display area in the plurality of first date sections, on the basis of the resolution management calendar output standard information that is generated through the first output standard information generator;

a first total information display that correspondingly displays monthly resolution total information including information on a total number and a total amount of monthly resolution information in the first monthly total information display area in the first total information section, on the basis of the resolution information displayed in each of the plurality of first date sections through the first information display; and a first report link that, on the basis of an area selection signal in the resolution management calendar that is input through the input device of the manager computer, provides, in a case where an area corresponding to the area selection signal in the resolution management calendar is the first information display area in the first date section for a specific date, a separate pop-up window for outputting a resolution status report for the specific date using resolution information displayed in the area, provides a separate pop-up window for outputting a resolution status report for a specific month in a case where the area corresponding to the area selection signal in the resolution management calendar is the first monthly total information display area in the total information section, and provides, in a case where the area corresponding to the area selection signal in the resolution management calendar is the first date display area in the first date section for the specific date, a separate pop-up window for inputting/outputting resolution information that allows confirmation of a specification of resolution information displayed in the area and generation of resolution information based on the resolution information input signal that is input through the input device of the manager computer, wherein the slip management calendar providing unit comprises:

a second calendar generator that generates a slip management calendar including a plurality of second date sections having a second date display area and a second information display area, and a second total information section having a second monthly total information display area for the slip information;

a second output standard information generator that generates slip management calendar output standard information including information regarding a first slip information output standard for determining which one of a slip registration date and a slip cost expected-execution date the slip information is to be displayed on the basis of, information regarding a second slip information output standard for determining which slip type of an income and an expenditure the slip information is to be displayed on the basis of, and information regarding a third slip information output standard for determining which one of a site name, a work type name, an account subject and a customer name a specification of the slip information is to be displayed on the basis of, for each second date section and each second total information section, on the basis of a slip management calendar output standard setting signal that is input through the input device of the manager computer;

a second information display that displays, while making slip information that satisfies the second slip information output standard in the slip information that is generated, stored and managed through the second information management unit correspond to each date in the slip management calendar according to the first slip information output standard, specification information on a total number of the slip information corresponding to each date, a total amount, or a site name, a work type name, an account subject or a customer name-based total amount according to the third slip information output standard, in each second information display area in the plurality of second date sections, on the basis of the slip management calendar output standard information that is generated through the second output standard information generator;

a second total information display that correspondingly displays monthly slip total information including information on a total number and a total amount of monthly slip information in the second monthly total information display area in the second total information section, on the basis of the slip information displayed in each of the plurality of second date sections through the second information display; and a second report link that, on the basis of an area selection signal in the slip management calendar that is input through the input device of the manager computer, provides, in a case where an area corresponding to the area selection signal in the slip management calendar is the second information display area in the second date section for a specific date, a separate pop-up window for outputting a slip ledger report for the specific date using slip information displayed in the area, provides a separate pop-up window for outputting a slip ledger status report for a specific month in a case where the area corresponding to the area selection signal in the slip management calendar is the second monthly total information display area in the total information section, and provides, in a case where the area corresponding to the area selection signal in the slip management calendar is the second date display area in the second date section for the specific date, a separate pop-up window for inputting/outputting slip information that allows confirmation of a specification of slip information displayed in the area and generation of slip information based on resolution information corresponding to the slip registration target selection signal input signal that is input through the input device of the manager computer, and wherein the petty cash management calendar providing unit comprises:

a third calendar generator that generates a petty cash management calendar including a plurality of third date sections having a third date display area and a third information display area, and a third total information section having a third monthly total information display area for the petty cash information;

a third output standard information generator that generates petty cash management calendar output standard information including information regarding a first petty cash information output standard for determining which one of a slip registration date and a slip cost expected-execution date, in the slip information in which the payment method is set to cash transfer, the petty cash information is to be displayed on the basis of, and information regarding a second petty cash information output standard for determining which one of entire bank accounts and a specific bank account among at least one bank account managed by the third information management unit the petty cash information is to be displayed on the basis of, on the basis of a petty cash management calendar output standard setting signal that is input through the input device of the manager computer;

a third information display that displays, while making slip information that satisfies the second petty cash information output standard in the slip information that is generated, stored and managed through the second information management unit, in which the payment method is set to cash transfer, correspond to each date in the petty cash management calendar according to the first petty cash information output standard, the petty cash information corresponding to each date in each third information display area in the plurality of third date sections, on the basis of the petty cash management calendar output standard information that is generated through the third output standard information generator;

a third total information display that correspondingly displays monthly petty cash total information including information on a total amount of specifications of the monthly petty cash information in the third monthly total information display area in the third total information section, on the basis of the petty cash information displayed in each of the plurality of third date sections through the third information display; and a third report link that, on the basis of an area selection signal in the petty cash management calendar that is input through the input device of the manager computer, provides, in a case where an area corresponding to the area selection signal in the petty cash management calendar is the third information display area in the third date section for a specific date, a separate pop-up window for outputting a cashbook report for the specific date using petty cash information displayed in the area, provides a separate pop-up window for outputting a cashbook report for a specific month in a case where the area corresponding to the area selection signal in the petty cash management calendar is the third monthly total information display area in the third total information section, and provides, in a case where the area corresponding to the area selection signal in the petty cash management calendar is the third date display area in the third date section for the specific date, the same pop-up window as the pop-up window provided through the second report link.

4. The system according to claim 3,
wherein the bill management calendar providing unit comprises:
a fourth calendar generator that generates a bill management calendar including a plurality of fourth date sections having a fourth date display area and a fourth information display area, and a fourth total information section having a fourth monthly total information display area for the bill information;
a fourth output standard information generator that generates bill management calendar output standard information including information regarding a first bill information output standard for determining which one of a slip registration date and a slip cost expected-execution date, in the slip information in which the payment method is set to bills, the bill information is to be displayed on the basis of, and information regarding a second bill information output standard for determining which bill type of an income related to bills-receivable and an expenditure related to bills-payable in the slip information the bill information is to be displayed on the basis of, for each fourth date section and each fourth total information section, on the basis of a bill management calendar output standard setting signal that is input through the input device of the manager computer;
a fourth information display that displays, while making slip information that satisfies the second bill information output standard in the slip information that is generated, stored and managed through the second information management unit, in which the payment method is set to bills, correspond to each date in the bill management calendar according to the first bill information output standard, bill information corresponding to each date in each fourth information display area in the plurality of fourth date sections, on the basis of the bill management calendar output standard information that is generated through the fourth output standard information generator;
a fourth total information display that correspondingly displays monthly bill total information including information on a total amount of specifications of monthly bill information in the fourth monthly total information display area in the fourth total information section, on the basis of the bill information displayed in each of the plurality of fourth date sections through the fourth information display; and
a fourth report link that, on the basis of an area selection signal in the bill management calendar that is input through the input device of the manager computer, provides, in a case where an area corresponding to the area selection signal in the bill management calendar is the fourth information display area in the fourth date section for a specific date, a separate pop-up window for outputting a bill ledger report for the specific date using bill information displayed in the area, provides a separate pop-up window for outputting a bill ledger report for a specific month in a case where the area corresponding to the area selection signal in the bill management calendar is the fourth monthly total information display area in the fourth total information section, and provides, in a case where the area corresponding to the area selection signal in the bill management calendar is the fourth date display area in the fourth date section for the specific date, the same pop-up window as the pop-up window provided through the second report link,
wherein the card management calendar providing unit comprises:
a fifth calendar generator that that generates a card management calendar including a plurality of fifth date sections having a fifth date display area and a fifth information display area, and a fifth total information section having a fifth monthly total information display area for the card information;
a fifth output standard information generator that generates card management calendar output standard information including information regarding a first card information output standard for determining which one of a slip registration date and a slip cost expected-execution date, in the slip information in which the payment method is set to cards, the card information is to be displayed on the basis of, information regarding a second card information output standard for determining which slip type of an income and an expenditure in the slip information the card information is to be displayed on the basis of, and information regarding a third card information output standard for determining which one of entire cards and a specific card, in card identification information of slip information in which the payment method is set to cards, the card information is to be displayed on the basis of, for each fifth date section and each fifth total information section, on the basis of a card management calendar output standard setting signal that is input through the input device of the manager computer;
a fifth information display that displays, while making slip information that satisfies the second card information output standard and the third card information output standard in the slip information that is generated, stored and managed through the second information management unit, in which the payment method is set to cards, correspond to each date in the card management calendar according to the first card information output standard, the card information corresponding to each date in each fifth information display area in the plurality of fifth date sections, on the basis of the card management calendar output standard information that is generated through the fifth output standard information generator;
a fifth total information display that correspondingly displays monthly card total information including information on a total amount of specifications of monthly card information in the fifth monthly total information display area in the fifth total information section, on the basis of the card information displayed in each of the plurality of fifth date sections through the fifth information display; and
a fifth report link that, on the basis of an area selection signal in the card management calendar that is input through the input device of the manager computer, provides, in a case where an area corresponding to the area selection signal in the card management calendar is the fifth information display area in the fifth date section for a specific date, a separate pop-up window for outputting a credit card purchase status report or a credit card sales status report for the specific date using card information displayed in the area, provides a separate pop-up window for outputting a credit card purchase status report or a credit card sales status report for a specific month in a case where the area corresponding to the area selection signal in the card management calendar is the fifth monthly total information display area in the fifth total information section, and provides, in a case where the area corresponding to the area selection signal in the card management calendar is the fifth date display area in the fifth date section for the specific date, the same pop-up window as the pop-up window provided through the second report link, on the basis of the area selection signal within the card management calendar that is input by the input device of the manager computer, wherein the credit management calendar providing unit comprises:

a sixth calendar generator that generates a credit management calendar including a plurality of sixth date sections having a sixth date display area and a sixth information display area, and a sixth total information section having a sixth monthly total information display area for credit information;

a sixth output standard information generator that generates credit management calendar output standard information including information regarding a first credit information output standard for determining which one of a slip registration date and a slip cost expected-execution date the slip information in which the payment method is set to credit is to be displayed on the basis of, and information regarding a second credit information output standard for determining which slip type of an income and an expenditure in the slip information credit information is to be displayed on the basis of, for each sixth date section and each sixth total information section, on the basis of a credit management calendar output standard setting signal that is input through the input device of the manager computer;

a sixth information display that displays, while making slip information that satisfies the second credit information output standard in the slip information that is generated, stored and managed through the second information management unit, in which the payment method is set to credit, correspond to each date in the credit management calendar according to the first credit information output standard, the credit information corresponding to each date in each sixth information display area in the plurality of sixth date sections, on the basis of the credit management calendar output standard information that is generated through the sixth output standard information generator;

a sixth total information display that correspondingly displays monthly credit total information including information on a total amount of specifications of monthly credit information in the sixth monthly total information display area in the sixth total information section, on the basis of the credit information displayed in each of the plurality of sixth date sections through the sixth information display; and a sixth report link that, on the basis of an area selection signal in the credit management calendar that is input through the input device of the manager computer, provides, in a case where an area corresponding to the area selection signal in the credit management calendar is the sixth information display area in the sixth date section for a specific date, a separate pop-up window for outputting a credit purchase ledger report or a credit sales ledger report for the specific date using credit information displayed in the area, provides a separate pop-up window for outputting a total unpaid state report for a specific month in a case where the area corresponding to the area selection signal in the credit management calendar is the sixth monthly total information display area in the sixth total information section, and provides, in a case where the area corresponding to the area selection signal in the credit management calendar is the sixth date display area in the sixth date section for the specific date, the same pop-up window as the pop-up window provided through the second report link, on the basis of the area selection signal within the credit management calendar that is input through the input device of the manager computer, and wherein the profit/loss management calendar providing unit comprises:

a seventh calendar generator that generates a credit management calendar including a plurality of seventh date sections having a seventh date display area and a seventh information display area, and a seventh total information section having a seventh monthly total information display area for credit information;

a seventh output standard information generator that generates profit/loss management calendar output standard information including information regarding a first profit/loss information output standard for determining which one of a slip registration date and a slip cost expected-execution date in the slip information the profit/loss information is to be displayed on the basis of, information regarding a second profit/loss information output standard for determining which one of a date-based display and a month-based date-cumulative display the profit/loss information is to be displayed on the basis of, information regarding a third profit/loss information output standard for determining whether to display an increase/decrease ratio compared to the previous day in at least one of a total income, a total expenditure, and a difference between the total income and the total expenditure in the slip information, information regarding a fourth profit/loss information output standard for determining whether to display information on at least one of an increase/decrease ratio of the total expenditure to the total income and an increase/decrease ratio of the difference between the total income and the total expenditure in the slip information, and information regarding a fifth profit/loss information output standard for determining which of a supply price, a value-added tax, or a total amount of the supply value and the value-added tax in the slip information the total income, the total expenditure, and the difference between the total income and total expenditure are to be displayed on the basis, for each seventh date section and each seventh total information section, on the basis of a credit management calendar output standard setting signal that is input through the input device of the manager computer;

a seventh information display that displays, while making profit/loss information generated by computing the slip information that is generated, stored and managed through the second information management unit according to the third profit/loss output standard to the fifth profit/loss information output standard correspond to each date in the profit/loss management calendar according to the first profit/loss information output standard and the second profit/loss information output standard, the profit/loss information corresponding to each date in each seventh information display area in the plurality of seventh date sections, on the basis of the profit/loss management calendar output standard information that is generated through the seventh output standard information generator;

a seventh total information display that correspondingly displays monthly profit/loss total information including information on a total amount of specifications of monthly profit/loss information in the seventh monthly total information display area in the seventh total information section, on the basis of the profit/loss information displayed in each of the plurality of seventh date sections through the seventh information display; and a seventh report link that, on the basis of an area selection signal in the profit/loss management calendar that is input through the input device of the manager computer, provides, in a case where an area corresponding to the area selection signal in the profit/loss management calendar is the seventh information display area in the seventh date section for a specific date, a separate pop-up window for outputting a profit/loss ledger report for the specific date using profit/loss information displayed in the area, provides a separate pop-up window for outputting a profit/loss status report for a specific month in a case where the area corresponding to the area selection signal in the profit/loss management calendar is the seventh monthly total information display area in the seventh total information section, and provides, in a case where the area corresponding to the area selection signal in the profit/loss management calendar is the seventh date display area in the seventh date section for the specific date, the same pop-up window as the pop-up window provided through the second report link, on the basis of the area selection signal within the profit/loss management calendar that is input through the input device of the manager computer.

\*　\*　\*　\*　\*